(12) United States Patent
Sugawa et al.

(10) Patent No.: US 6,480,235 B1
(45) Date of Patent: Nov. 12, 2002

(54) SEMICONDUCTOR INTEGRATED CIRCUIT

(75) Inventors: Satoshi Sugawa, Tokyo (JP); Hiroshi Kuranaga, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/521,459

(22) Filed: Mar. 8, 2000

(30) Foreign Application Priority Data

Sep. 10, 1999 (JP) ............................................ 11-256844

(51) Int. Cl.[7] .............................. H04N 3/27; H04N 5/46
(52) U.S. Cl. ........................................ 348/554; 345/698
(58) Field of Search ................................ 348/554, 555, 348/556, 558, 441, 445, 458, 440.1; 345/699, 698; H04N 3/27, 5/46

(56) References Cited

U.S. PATENT DOCUMENTS

| | | | | |
|---|---|---|---|---|
| 5,455,627 A | * | 10/1995 | Eitzmann et al. | 348/441 |
| 5,838,381 A | * | 11/1998 | Kasahara et al. | 348/441 |
| 6,118,486 A | * | 9/2000 | Reitmeier | 348/435.1 |
| 6,359,654 B1 | * | 3/2002 | Glennon et al. | 348/440.1 |

FOREIGN PATENT DOCUMENTS

| | | |
|---|---|---|
| JP | 7-312699 | 11/1995 |
| JP | 8-65664 | 3/1996 |

OTHER PUBLICATIONS

"Digital Television Fundamentals: Design and Installation of Video and Audio Systems", by M. Robin, et al., Chapter 3, pp. 184–201.

* cited by examiner

Primary Examiner—Michael H. Lee
(74) Attorney, Agent, or Firm—McDermott, Will & Emery

(57) ABSTRACT

A plurality of frames constituting a screen are divided into a plurality of groups such as G1 through G4. The number of pixels per line is made different between any adjacent two of these groups in such a manner that all lines included in each group will have the same number of pixels each. There should be a plurality of groups such as G2 through G4 which exclude lines having active pixels corresponding to image portions. Lines 1 through 480 having active pixels may have the same number of pixels each. The number of pixels per line is allowed to be different by 1 between any adjacent two of the groups.

20 Claims, 16 Drawing Sheets

FIG. 2A

| LINE # | PIXEL # | | | | | | | | | |
|---|---|---|---|---|---|---|---|---|---|---|
| 1 | 1 | 2 | 3 | 4 | ------- | 854 | 855 | 856 | 857 | 858 |
| | 1 | 2 | 3 | 4 | ------- | 854 | 855 | 856 | 857 | 858 |
| | 1 | 2 | 3 | 4 | ------- | 854 | 855 | 856 | 857 | 858 |
| | 1 | 2 | 3 | 4 | ------- | 854 | 855 | 856 | 857 | 858 |
| | 1 | 2 | 3 | 4 | ------- | 854 | 855 | 856 | 857 | 858 |
| 480 | 1 | 2 | 3 | 4 | ------- | 854 | 855 | 856 | 857 | 858 |
| 481 | 1 | 2 | 3 | 4 | ------- | 854 | 855 | 856 | 857 | 858 |
| 525 | 1 | 2 | 3 | 4 | ------- | 854 | 855 | 856 | 857 | 858 |

FIG. 2B

| GROUP | LINE # | PIXEL # | | | | | | | | | | |
|---|---|---|---|---|---|---|---|---|---|---|---|---|
| G1 | 1 | 1 | 2 | 3 | 4 | ------- | 854 | 855 | 856 | 857 | | |
| | | 1 | 2 | 3 | 4 | ------- | 854 | 855 | 856 | 857 | | |
| | | 1 | 2 | 3 | 4 | ------- | 854 | 855 | 856 | 857 | | |
| | | 1 | 2 | 3 | 4 | ------- | 854 | 855 | 856 | 857 | | |
| | 480 | 1 | 2 | 3 | 4 | ------- | 854 | 855 | 856 | 857 | | |
| G2 | 481 | 1 | 2 | 3 | 4 | ------- | 854 | 855 | 856 | 857 | 858 | |
| | 487 | 1 | 2 | 3 | 4 | ------- | 854 | 855 | 856 | 857 | 858 | |
| G3 | 488 | 1 | 2 | 3 | 4 | ------- | 854 | 855 | 856 | 857 | 858 | 859 |
| | | 1 | 2 | 3 | 4 | ------- | 854 | 855 | 856 | 857 | 858 | 859 |
| | | 1 | 2 | 3 | 4 | ------- | 854 | 855 | 856 | 857 | 858 | 859 |
| | 517 | 1 | 2 | 3 | 4 | ------- | 854 | 855 | 856 | 857 | 858 | 859 |
| G4 | 518 | 1 | 2 | 3 | 4 | ------- | 854 | 855 | 856 | 857 | 858 | |
| | 525 | 1 | 2 | 3 | 4 | ------- | 854 | 855 | 856 | 857 | 858 | |

| START LINE # | END LINE # | FIELD # | ACTIVE (※1) | NUMBER OF LINES | NUMBER OF SAMPLES 60Hz | NUMBER OF SAMPLES 59.94Hz |
|---|---|---|---|---|---|---|
| 1 | 3 | 2 | 0 | 3 | 859 | 858 |
| 4 | 9 | 1 | 0 | 6 | 859 | 858 |
| 10 | 15 | 1 | 1 | 6 | 859 | 858 |
| 16 | 19 | 1 | 1 | 4 | 858 | 858 |
| 20 | 259 | 1 | 1 | 240 | 857 | 858 |
| 260 | 263 | 1 | 1 | 4 | 858 | 858 |
| 264 | 265 | 1 | 0 | 2 | 859 | 858 |
| 266 | 272 | 2 | 0 | 7 | 859 | 858 |
| 273 | 278 | 2 | 1 | 6 | 859 | 858 |
| 279 | 282 | 2 | 1 | 4 | 858 | 858 |
| 283 | 522 | 2 | 1 | 240 | 857 | 858 |
| 523 | 525 | 2 | 1 | 3 | 858 | 858 |
| | | | TOTAL | 525 | 450000 | 450450 |

(※1) 0:BLANKING, 1:ACTIVE LINE

FIG. 7

SEMICONDUCTOR INTEGRATED CIRCUIT

BACKGROUND OF THE INVENTION

1. Field of the Invention

The present invention relates to a semiconductor integrated circuit for outputting video signals to a display device or the like and, more particularly, to a semiconductor integrated circuit with an improved format in which the video signals are composed.

2. Description of the Background Art

Some video signals that are output to a display device or the like have different frame frequencies (i.e., number of frames output per unit time). A progressive digital image of the NTSC system has 450,450 pixels (=525 lines×858 pixels) per frame output from a semiconductor integrated circuit in synchronism with a clock at a frequency of 27 MHz. In this case, the frame frequency for the progressive digital image of the NTSC system is given as $27 \times 10^6 / 450,450 = 59.94$ Hz. Meanwhile, a progressive digital image according to the digital television system usually has a frame frequency of 60 Hz. If that digital image is to have 450,450 pixels (=525 lines×858 pixels) per frame, then these pixels need to be output in synchronism with a clock at a frequency of 27.027 MHz.

Semiconductor integrated circuits capable of outputting a plurality of types of digital images at different frame frequencies are for general purpose use and are now in increasing demand. Such a semiconductor integrated circuit requires preparing a plurality of clocks having different frequencies: a 27 MHz clock for the NTSC system and a 27.027 MHz clock for the digital television system. Using a plurality of oscillators to provide clocks of different frequencies necessarily makes an entire image output system more costly than before. It is thus preferred to have a semiconductor integrated circuit that will operate on a single oscillator regardless of the frame frequency of the video signal in use. One such semiconductor integrated circuit is disclosed illustratively in Japanese Patent Laid-open No. Hei 8-65664.

According to FIG. 11 of the cited patent application, the disclosed semiconductor integrated circuit generates a video signal of 450,450 pixels (=525 lines×858 pixels) per frame with a field frequency of 29.97 Hz and of 450,000 pixels per frame with a field frequency of 30 Hz. The number of pixels per frame may be reduced for the field frequency of 30 Hz, which permits the use of a common 13.5 MHz clock. Where the field frequency is 30 Hz, lines 0 through 261 have 858 pixels each and line 262 has 632 pixels in a first field. In a second field, lines 263 through 523 have 858 pixels each and line 524 has 632 pixels. The two lines have a considerably reduced number of pixels each compared with the other lines. This triggers significant changes in horizontal scanning frequencies of the two lines when they are scanned.

Having a marked change in horizontal scanning frequency is detrimental to displaying an image on a display device. In particular, the marked change is not suitable in cases where the display device is equipped with a PLL (phase locked loop) circuit to receive a horizontal synchronizing signal reflecting a horizontal scanning frequency in order to reestablish synchronization in the horizontal direction based on that horizontal synchronizing signal. In such cases, an abrupt change in horizontal scanning frequency causes an unlock of the PLL circuit. Once the PLL circuit is unlocked, it takes time for the circuit to return to its locked state. This can result in a disturbed image on the display device.

SUMMARY OF THE INVENTION

It is therefore an object of the present invention to provide a semiconductor integrated circuit which, during display of a video signal entailing changes in the number of pixels between lines, outputs a video signal minimizing adverse effects on the image to be displayed on a display device.

It is another object of the invention to provide a semiconductor integrated circuit capable of modifying a format in which video signals are composed.

It is a further object of this invention to provide a specific constitution of a semiconductor integrated circuit conducive to implementing the above objects of the present invention.

The above objects of the present invention are achieved by a semiconductor integrated circuit for outputting a first video signal which corresponds to a screen and which has a plurality of pixels on each of a plurality of lines constituting the screen. Part of the pixels are active pixels representing image portions to be displayed on a display device. The plurality of lines are divided into a plurality of line groups. Each of the groups includes at least two consecutive lines. The lines included in each group have the same number of pixels each. On the other hand, the number of pixels per line is made different between any adjacent two of the plurality of line groups. The plurality of line groups include a plurality of line groups excluding lines having the active pixels.

The above objects of the present invention are also achieved by a semiconductor integrated circuit for outputting a video signal which corresponds to a screen and which has a plurality of pixels on each of a plurality of lines constituting the screen. Part of the pixels are active pixels representing image portions to be displayed on a display device. The semiconductor integrated circuit includes a plurality of first registers. The plurality of lines are divided into a plurality of line groups each including at least two lines. The lines included in each group have the same number of pixels each, while the number of pixels per line is made different between any adjacent two of the plurality of line groups. The number of lines included in each of the plurality of line groups is determined based on values placed in the plurality of first registers.

The above objects of the present invention are achieved by a semiconductor integrated circuit for outputting in synchronism with a clock signal a video signal which corresponds to a screen and which has a plurality of pixels on each of a plurality of lines constituting the screen. The semiconductor integrated circuit includes a pixel counter for counting up the clock signal in order to output a pixel number on each line. A comparator is provided for comparing a count value of the pixel counter with a comparative value. A line counter is further provided for counting up a match signal output by the comparator in order to output a line number. The semiconductor integrated circuit also includes a controller for supplying the comparative value to the comparator. The controller includes a plurality of decision circuits for which mutually exclusive ranges are established and which judge whether a count value of the line counter falls within any one of the established ranges. The controller further includes a first selector which receives a plurality of mutually exclusive values and selects one of the values in accordance with the judgments by the plurality of decision circuits. The selected value is output as the comparative value to the comparator.

Other objects and further features of the present invention will be apparent from the following detailed description when read in conjunction with the accompanying drawings.

BRIEF DESCRIPTION OF THE DRAWINGS

FIGS. 2A and 2B are schematic views showing structures of a single frame of video signals output by the semiconductor integrated circuit as the first embodiment;

FIGS. 5A to 5F are timing charts illustrating the workings of the output control circuit 3 in FIG. 3;

FIG. 7 is a schematic view depicting a structure of a single frame of yet another video signal output by a semiconductor integrated circuit practiced as a third embodiment of this invention;

DESCRIPTION OF THE PREFERRED EMBODIMENTS

Figure 1:
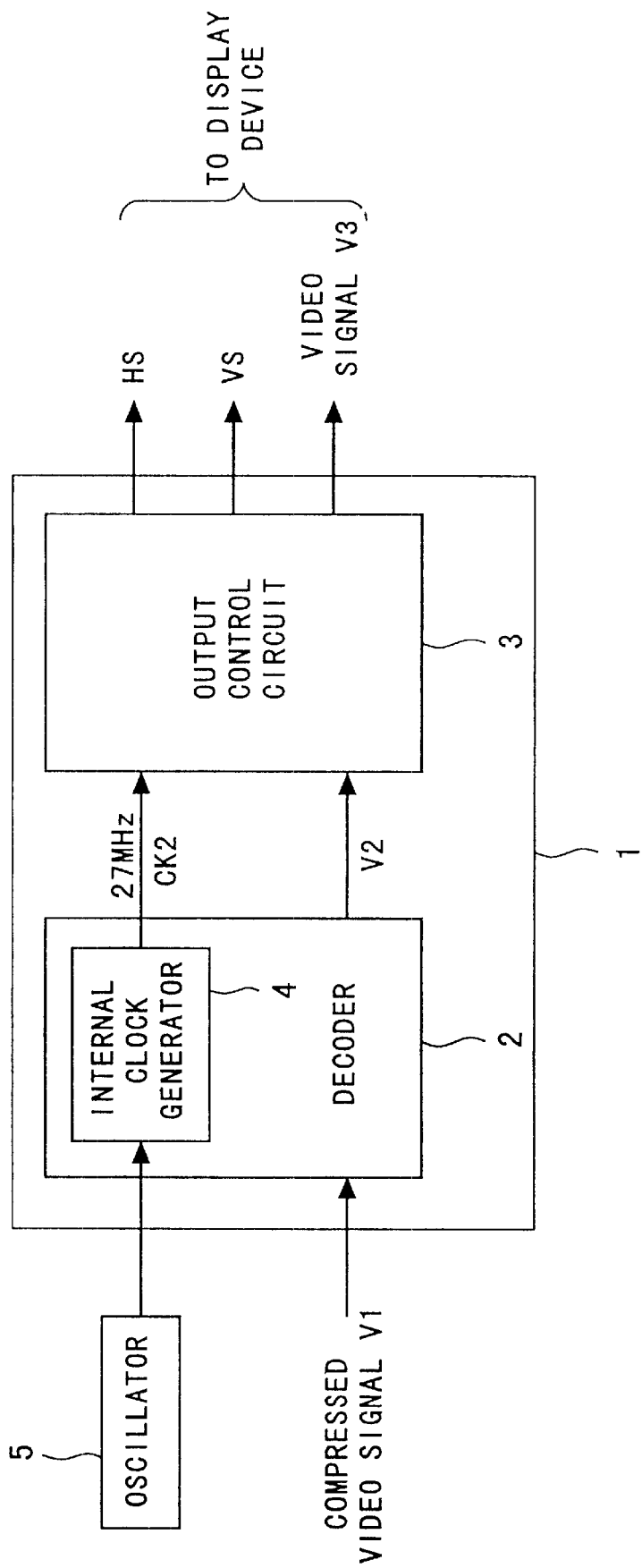
FIG. 1 is a block diagram of a semiconductor integrated circuit practiced as a first embodiment of this invention.

In the following, principles and embodiments of the present invention will be described with reference to the accompanying drawings. In the drawings, like reference characters designate like or corresponding parts.

First Embodiment

FIG. 1 is a block diagram of a semiconductor integrated circuit practiced as the first embodiment of this invention. A one-chip semiconductor integrated circuit 1 comprises a decoder 2 and an output control circuit 3. On receiving a video signal V1 that was compressed according to the MPEG2 standard, the decoder 2 decodes the received signal VI as per MPEG2 and outputs a decompressed video signal V2. The decoder 2 has an internal clock generator 4 that generates a plurality of clock signals having different frequencies on the basis of a 54 MHz clock signal CK1 received from an oscillator 5. Using these clock signals, the decoder 2 performs various decoding processes. The multiple clock signals include a 27 MHz clock signal CK2 acquired by frequency-dividing the clock signal CK1 in two.

The video signal V2 is made of a plurality of pixels each constituted by a plurality of bits (e.g., 24 bits). In synchronism with a clock signal generated in the decoder 2, the video signal V2 is output one pixel per one cycle.

Upon receipt of the video signal V2 and clock signal CK2, the output control circuit 3 generates three signals: a video signal V3 formed by adding a plurality of pixels to the video signal V2, a horizontal synchronizing signal HS having each line of the video signal V3 as a single cycle, and a vertical synchronizing signal VS having a single picture of the video signal V3 as a single cycle. These signals are output to a display device. The video signal V3 is also made of a plurality of pixels each constituted by a plurality of bits (e.g., 24 bits), and is output one pixel per cycle in synchronism with the clock signal CK2.

Of the pixels of the video signal V3, those making up the video signal V2 constitute an image to be actually displayed on the display device, which image includes 345,600 pixels (=480 lines×720 pixels) per frame. The pixels that constitute an actually displayed image are called active pixels hereunder. The pixels added anew to the video signal V2 are provided so as to ensure a horizontal and a vertical blanking interval in which the screen scanning line of the display returns in the horizontal and vertical directions respectively. As such, the added pixels are blanking pixels irrelevant to the images to be displayed.

The semiconductor integrated circuit 1 is capable of outputting a plurality of types of images having different frame frequencies. The first embodiment is shown below as handling illustratively a progressive digital image of the NTSC system at a frame frequency of 59.94 Hz and a progressive digital image of the digital television system at a frame frequency of 60 Hz.

FIGS. 2A shows a single-frame structure of the video signal V3 corresponding to the image at the frame frequency of 59.94 Hz (the signal is called the video signal V3a hereunder). FIG. 2B depicts a single-frame structure of the video signal V3 corresponding to the image at the frame frequency of 60 Hz (the signal is called the video signal V3b hereunder). One frame corresponds to one screen because the signals V3a and V3b represent a progressive image each.

In FIG. 2A, the video signal V3a is constituted per frame by 525 lines each having 858 pixels, which amounts to a total of 450,450 pixels. Pixels 1 through 720 on each of lines 1 through 480 are active pixels numbering 345,600 in total. The remaining pixels are blanking pixels.

In FIG. 2B, the video signal V3b like the video signal V3a is constituted per frame by 525 lines. Pixels 1 through 720 on each of lines 1 through 480 are active pixels numbering 345,600 in total. The remaining pixels are blanking pixels.

Because the video signal V3b uses the same clock signal CK2 as the video signal V3a, the video signal V3b has 450,000 pixels per frame, i.e., 450,450 minus 450 pixels. This requires having different lines composed of different numbers of pixels. Given that requirement, the number of pixels on each line is set according to rules (A) and (B) below in order to inhibit image disturbances on the display device.

(A) A total of 525 lines is divided into a plurality of groups so that each group will have a plurality of serially numbered lines. Each of the lines in each group should have the same number of pixels. The number of pixels per line should be made different between adjacent groups.

(B) For those line portions that have no active pixels,. the number of pixels per line should be made different between lines. In order to prevent an abrupt change in the number of pixels per line, there should at least be two groups that contain no active pixels.

FIG. 2B shows a single-frame structure of the video signal V3b in which the number of pixels per line is set according to the rules (A) and (B) above. For the signal structure of FIG. 2B, rules (C) and (D) below are further considered.

(C) Where the number of pixels is varied on 480 lines having active pixels, the frequency of the horizontal synchronizing signal HS changes while the lines corresponding to an image are being scanned consecutively. This state is thought to have a direct impact on the image and likely to result in a perturbed image. Thus the total pixel number should be made the same on each of all lines having active pixels.

(D) Any abrupt change in the number of pixels per line is prevented more effectively by making the number of pixels differ by one pixel per line between adjacent groups.

In FIG. 2B, the lines are divided into four groups. Lines 1 through 480 belong to a group G1 and have 857 pixels each. Lines 481 through 487 make up a group G2 and retain 858 pixels each. Lines 488 through 517 constitute a group G3 and have 859 pixels each. Lines 518 through 525 included in a group G4 possess 858 pixels each.

The video signals V3a and V3b shown respectively in FIGS. 2A and 2B are output by the output control circuit 3 one pixel at a time in synchronism with the 27 MHz clock signal. The semiconductor integrated circuit 1 consecutively outputs pixels making up each of lines 1 through 525 in ascending numeric order. On each line, the pixels are output successively starting from pixel 1 in ascending numeric order. The last pixel on each line is followed by pixel 1 of the next line. The last pixel of the last line 525 is followed by pixel 1 on line 1 of the next frame. This single-frame output operation is repeated for each of the frames involved.

Because two types of video signals having different frame frequencies can be output using the clock signal CK2 of the same frequency, the entire system configuration including the semiconductor integrated circuit 1 and display device need only have a single oscillator 5. The system is thus made less expensive than before. Since one of the two video signals is formed in accordance with the rules (A) and (B) above, the number of pixels varied between lines is made lower than, say, that of the semiconductor integrated circuit disclosed in Japanese Patent Laid-open No. Hei 8-65664, thereby minimizing disturbances of images to be displayed on a display device. When the video signal is formed by additionally complying with the rule (C) or (D) above, the effect of inhibiting image disturbances becomes further noticeable.

Alternatively, the decoder 2 and output control circuit 3 may be constituted by separate semiconductor chips each making up a semiconductor integrated circuit.

Figure 3:
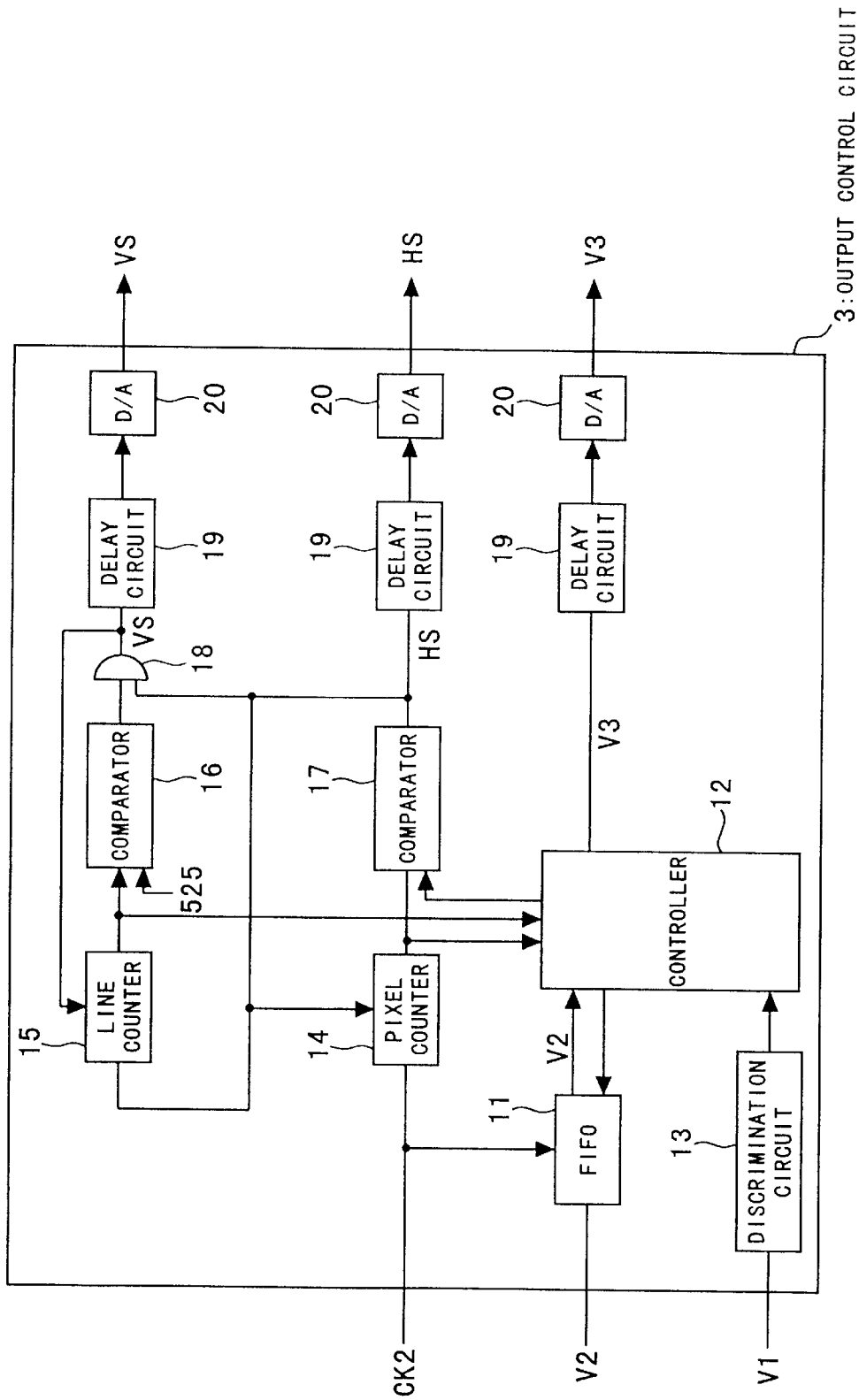
FIG. 3 is a block diagram of an output control circuit 3 in the semiconductor integrated circuit of FIG. 1.

FIG. 3 depicts a typical structure of the output control circuit 3. The output control circuit 3 comprises a first-in first-out memory (FIFO) 11, a controller 12, a discrimination circuit 13, a pixel counter 14, a line counter 15, and comparators 16 and 17.

The FIFO 11 temporarily stores the video signal V2 before its output. A plurality of active pixels constituting the video signal V2 are successively input to the FIFO 11. The active pixels are output from the FIFO 11 in the same order in which they were input in synchronism with the clock signal CK2.

The discrimination circuit 13 analyzes a code in the compressed video signal V1 to generate a discrimination signal determining whether the decompressed video signal V2 corresponds to an image of the NTSC system or represents an image of the digital television system. The discrimination signal is a one-bit digital signal that is set to "0" for images of the NTSC system and set to "1" for images of the digital television system. That is, the discrimination signal determines whether the frame frequency of the video signal V3 is 59.94 Hz or 60 Hz.

The pixel counter 14 counts the clock signal CK2 and outputs the count value. The count value accords with a pixel number, which denotes an output order of every pixel in a given line, assigned to a pixel being output from the controller 12.

On the basis of the count value from the pixel counter 14, the controller 12 outputs the video signal V3 in the form of a video signal V2 supplemented with blanking pixels. The controller 12 also outputs a value representing the total number of pixels belonging to the lines output as the video signal V3.

The comparator 17 compares the count value from the pixel counter 14 with the number of pixels from the controller 12. The comparator 17 outputs a one-bit result of "1" if there is a match between the two compared values and "0" if there is a mismatch therebetween. In other words, the comparator 17 outputs "1" only if the controller 12 outputs the last pixel of each line. The result of the comparison by the comparator 17 is sent out of the output control circuit 3 as the horizontal synchronizing signal HS and is also output to the pixel counter 14. Given the result "1" from the comparator 17, the pixel counter 14 resets its count to "1."

The line counter 15 counts up the result "1" from the comparator 17. The count value of the line counter 15 indicates the number of the line to which the pixels being output by the controller 12 belong.

The comparator 16 compares the count value from the line counter 15 with "525," i.e., the number of the last line of a given frame. The comparator 16 outputs "1" if there is a match between the two values compared and "0" if there is a mismatch therebetween. That is, the count value output by the line counter 15 denotes the number of the line to which the pixels being output by the controller 12 belong.

An AND circuit 18 ANDs the results of comparisons by the two comparators 17 and 18. It follows that the AND circuit 18 outputs "1" only when the pixel output by the controller 12 is the last pixel on the last line of a given frame. The output value of the AND circuit 18 is sent out of the output control circuit 3 as the vertical synchronizing signal VS and is also output to the line counter 15. Given the output value of "1" from the AND circuit 18, the line counter 15 resets its count to "1."

The horizontal synchronizing signal HS, vertical synchronizing signal VS and video signal V3 pass through a delay circuit 19 and a D/A converter 20 each before being output to the display device. The delay circuits 19 suitably delay the signals so that they will be output in a properly timed manner. The D/A converters 20 convert the signals from digital to analog format.

Figure 4:
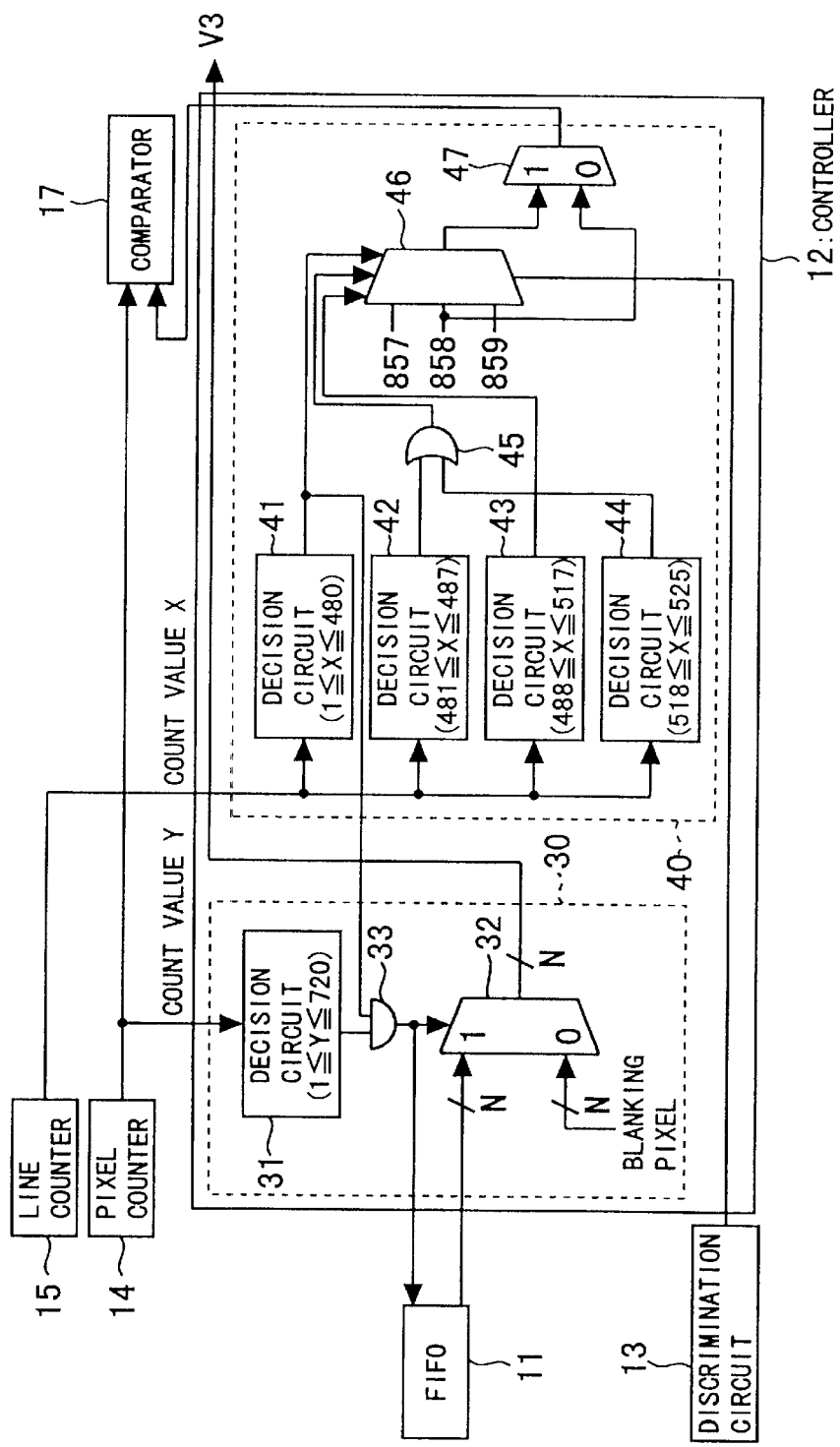
FIG. 4 is a block diagram of a controller 12 in the output control circuit of FIG. 3.

FIG. 4 shows a typical structure of the controller 12. The controller 12 comprises a first and a second signal generation circuit 30 and 40. The first signal generation circuit 30 outputs the video signal V3, and the second signal generation circuit 40 generates a signal to be fed to the comparator 17 as a signal indicating the total number of pixels on lines.

The second signal generation circuit 40 includes a decision circuits 41 through 44, an OR circuit 45, and selectors 46 and 47. The decision circuit 41 determines whether a count value X output by the line counter 15 falls within a range of 1 to 480. If the count value X is found to be within the range, the decision circuit 41 outputs "1"; if the count value X is outside the range, the decision circuit 41 outputs "0." The decision circuit 42 determines whether the count value X falls within a range of 481 to 487. If the count value X is found to be within the range, the decision circuit 42 outputs "1"; if the count value X turns out to be outside the range, the decision circuit 42 outputs "0." The decision circuit 43 checks to see if the count value X falls within a range of 488 to 517. If the count value X is judged to be within the range, the decision circuit 43 outputs "1"; if the count value X is found to be outside the range, the decision circuit 43 outputs "0." The decision circuit 44 checks to see if the count value X falls within a range of 518 to 525. If the count value X is judged to be within the range, the decision circuit 44 outputs "1"; if the count value X is found to be outside the range, the decision circuit 44 outputs "0." As described, the decision circuits 41 through 44 are set for mutually exclusive ranges and determine whether the count value X falls within the respective ranges.

The OR circuit 45 ORs the outputs from the decision circuits 42 and 44. The selector 46 receives a signal denoting "857," a signal indicating "858," and a signal representing "859." If the decision circuit 41 outputs "1," the selector 46 selects and outputs the signal denoting "857." If the OR circuit 45 outputs "1," the selector 46 selects and outputs the signal indicating "858." If the decision circuit 43 outputs "1," the selector 46 selects and outputs the signal representing "859." The selector 47 receives a discrimination signal from the discrimination circuit 13. If the discrimination signal is "1," the selector 47 selects and outputs the output of the selector 46. If the discrimination signal is "0," the selector 47 selects and outputs the signal indicating "858."

The second signal generation circuit 40 of the above-described structure always supplies the comparator 17 with the signal denoting "858" if the video signal V2 output by the FIFO 11 corresponds to an image having the frame frequency of 59.94 Hz. If the video signal V2 represents an image with the frame frequency of 60 Hz, the second signal generation circuit 40 feeds the output of the selector 46 to the comparator 17. The selector 46 outputs the signal representing "857" if the pixels output by the first signal generation circuit 30 as the video signal V3 belong to the group G1. If the pixels are found belonging to the group G2, the selector 46 outputs the signal denoting "858"; if the pixels belong to the group G3, the selector 46 outputs the signal indicating "859"; if the pixels belong to the group G4, the selector 46 outputs the signal representing "858."

The first signal generation circuit 30 includes a decision circuit 31, a selector 32 and an AND circuit 33. On receiving a count value Y from the pixel counter 14, the decision circuit 31 determines whether the count value Y designates an active pixel or a blanking pixel. More specifically, the decision circuit 31 checks to see if the count value Y falls within a range of 1 to 720. If the count value Y is found to be within the range, the decision circuit 31 outputs "1"; if the count value Y is judged to be outside the range, the decision circuit 31 outputs "0."

The AND circuit 33 ANDs the outputs of the decision circuits 31 and 41, and outputs the result of the AND operation. Thus the AND circuit 33 outputs "1" only when the count value Y falls within the range of 1 to 720, as well as the count value of the line counter 15 falls within the range of 1 to 480.

The selector 32 receives the output of the AND circuit 33. If the received output is "1," the selector 32 selects and outputs the video signal V2 from the FIFO 11. If the received output is "0," the selector 32 selects and outputs a blanking pixel. Blanking pixels are constituted illustratively by data that appear black or dark blue when displayed on a screen of the display device. Thus as shown in FIGS. 2A and 2B, the video signal V2 output by the selector 32 has active pixels numbered 1 through 720 set on lines 1 through 480. Blanking pixels are set for the remaining pixel numbers. On lines 481 through 525, blanking pixels are set for all pixel numbers.

The output of the AND circuit 33 is fed to the FIFO 11. The output of "0" from the AND circuit 33 causes the FIFO 11 to stop supplying pixels to the selector 32.

FIGS. 5A to 5F are timing charts showing waveforms of the clock signal CK2 and of the outputs from the pixel counter 14, line counter 15, comparators 16 and 17, and AND circuit 18. The pixel counter 14 is incremented by "1" starting from "1" every time a leading edge of the clock signal CK2 is encountered. Upon receipt of the last pixel number (e.g., 858) on a given line from the controller 12, the comparator 17 changes the horizontal synchronizing signal HS from "0" to "1" in response to a change from "857" to "858" of the count value on the pixel counter 14. Because the pixel counter 14 has received "1" from the comparator 17, the pixel counter 14 switches from the last pixel number of "858" to a value of "1" at the next leading edge of the clock signal CK2. The line counter 15 is incremented by "1" at each trailing edge of the output signal from the comparator 17.

Having received the last line number "525," the comparator 16 changes its output from "0" to "1" the moment the count value of the line counter 15 changes from "524" to "525." The comparator 16 continuously outputs "1" while the count value of the line counter 15 remains "525." When the line counter 15 changes its count value from "525" to "1," the comparator 16 changes its output from "1" to "0." Therefore the output of the AND circuit 18 changes from "0" to "1" when the comparator 17 changes its output from "0" to "1" provided the line counter 15 keeps outputting "525." The AND circuit 18 changes its output from "1" to "0" the moment the output of the comparator 17 changes from "1" to "0" while the line counter 15 is outputting "525."

As described, the line counter 15 counts from "1" up to the last line number and repeats the counting operation. The pixel counter 14 counts from "1" up to the last pixel number corresponding to the line number output by the line counter 15, and repeats the counting operation likewise. The horizontal synchronizing signal HS is output as "1" as long as the pixel counter 14 keeps outputting the last pixel number of a given line. The vertical synchronizing signal VS is output as "1" if the line counter 15 outputs the last line number and if the pixel counter 14 outputs the last pixel number of the line designated by the last line number in question.

In FIG. 3, the discrimination circuit 13 may be replaced alternatively by a rewritable one-bit register in the output control circuit 3, the register being used to determine whether the video signal V3 has the frame frequency of 59.94 Hz or 60 Hz. In such an alternative setup, there is required inside or outside the semiconductor integrated circuit 1 a CPU which set to the register a discrimination signal indicating the frame frequency of 59.94 Hz or 60 Hz for the video signal V3 on one of three occasions: when power is applied to the system, when a reset signal is entered, or when frame frequencies are changed. The selector 47 in the controller 12 will make its selection based on the discrimination signal set to the alternatively installed register.

Second Embodiment

The second embodiment is constituted by a semiconductor integrated circuit that outputs two kinds of video signals: one representing interlaced images of the NTSC system with the frame frequency of 59.94 Hz, the other denoting interlaced images of the digital television system with the frame frequency of 60 Hz. The video signal output by this semiconductor integrated circuit is sent to a digital encoder (DENC). The DENC is an LSI that converts the digital video signal to the analog NTSC signal. The NTSC signal thus converted is output to a display device.

Figures 5, 6:
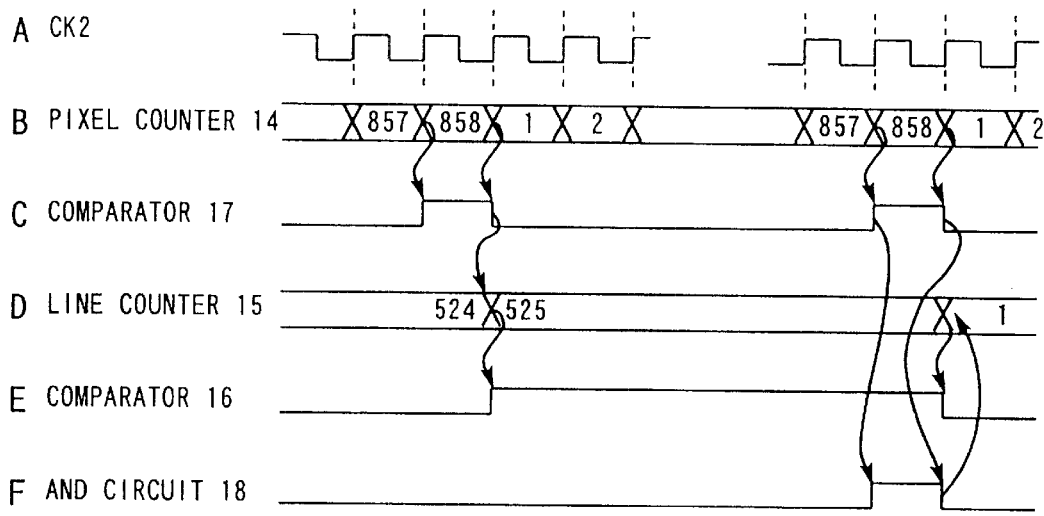
FIG. 6 is an explanatory view depicting a structure of a single frame of another video signal output by a semiconductor integrated circuit practiced as a second embodiment of this invention.

FIG. 6 is an explanatory view showing numbers of pixels on lines in a single-frame of the two kinds of video signals above.

The image as per the NTSC system is formed in a pixel format pursuant to the CCIR 601 standard and CCIR 656 standard. The video signals of the NTSC system and digital television system have 525 lines each. A total of 262 lines ranging from line 4 to line 265 constitutes a first field. The remaining 263 lines ranging from line 1 to line 3 and from line 266 to line 525 make up a second field. Since the two types of images are both interlaced images, one field corresponds to one screen in both cases.

In the first field, lines 20 through 259 have 720 active pixels each and the remaining pixels are blanking pixels. In the second field, lines 283 through 522 have 720 active pixels each and the remaining pixels are blanking pixels.

In the first field, lines 4 through 19 and 260 through 263 are optional blanking portions that are usually hidden and can be displayed optionally as desired. All pixels included in the optional blanking portions are constituted by data that appear black or dark blue when displayed on the screen of the display device.

In the second field, lines 273 through 282 and 523 through 525 are also optional blanking portions. All other lines belonging to the second field are blanking portions that are filled with blanking pixels. The lines and optional blanking portions having active pixels are called active lines hereunder.

The interlaced image with the frame frequency of 59.94 Hz has the same number of pixels on each of all lines, i.e., 858 pixels per line, which amounts to a total of 450,450 pixels. As in the case of the first embodiment, the video signal is output one pixel per cylce in synchronism with the 27 MHz clock signal.

On the other hand, the interlaced image with the frame frequency of 60 Hz has 450,000 pixels per frame, i.e., 450,450 minus 450 pixels, so that the pixels are output in synchronism with the 27 MHz clock signal. As in the case of the first embodiment, the number of pixels per line for the fields constituting each screen is determined according to the rules (A) through (D) stated above. The number of pixels per line may be varied by adding or removing pixels between an End of Active Video (EAV) part and a Start of Active Video (SAV) part.

In the first field, lines 4 through 15 have 859 pixels each; lines 16 through 19 have 858 pixels each; lines 20 through 259 have 857 pixels each; lines 260 through 263 have 858 pixels each; and lines 264 and 265 have 859 pixels each.

In the second field, lines 266 through 278 have 859 pixels each; lines 279 through 282 have 858 pixels each; lines 283 through 522 have 857 pixels each; lines 523 through 525 have 858 pixels each; and lines 1 through 3 have 859 pixels each.

Thus as with the first embodiment, the second embodiment can output two kinds of video signals having different frame frequencies by use of the clock signal CK2 of the same frequency as before. Because one of the two video signals is formed in accordance with the rules (A) through (D), disturbance of images on the display device is minimized.

Third Embodiment

Figure 7:
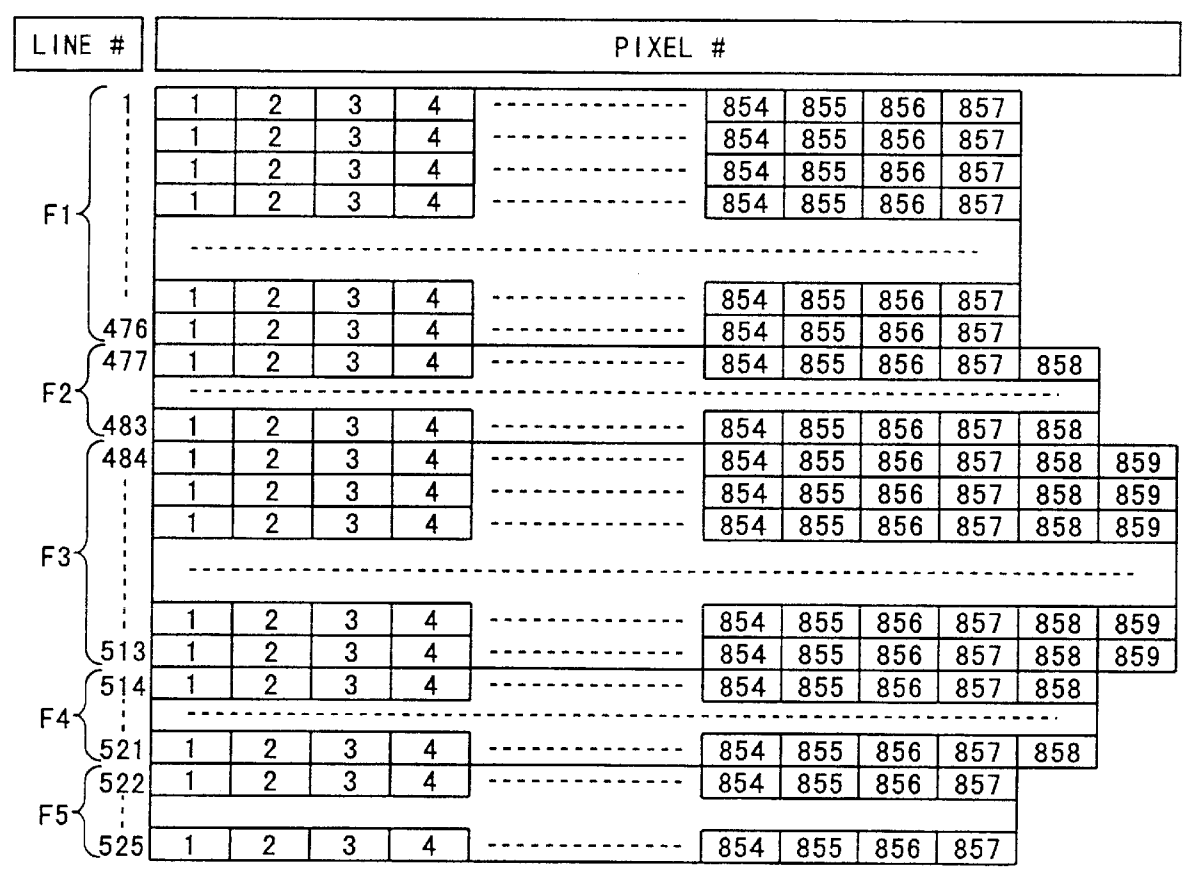

FIG. 7 is a schematic view depicting a structure of a single frame of yet another video signal used by a third embodiment. This video signal represents a progressive digital image of the NTSC system having the frame frequency of 59.94 Hz as in the case of the first embodiment.

The video signal of FIG. 7 is formed in accordance with the rules (A), (B) and (D) described above in connection with the first embodiment. A total of 525 lines is divided into five groups F1 through F5, each group having the same number of pixels on all lines. Lines 1 through 476 belong to the group F1 and have 857 pixels each. Lines 477 through 483 belong to the group F2 and have 858 pixels each. Lines 484 through 513 belong to the group F3 and have 859 pixels each. Lines 514 through 521 belong to the group F4 and have 858 pixels each. Lines 522 through 525 belong to the group F5 and have 857 pixels each. Pixels 1 through 720 on each of lines 1 through 480 are active pixels.

The third embodiment is characterized in that the number of pixels on each of lines 522 through 525 is made the same as that (857) on the first line 1 having active pixels. Consider a case in which the video signal is displayed on a display device that incorporates a PLL circuit for reestablishing horizontal synchronization of images based on a horizontal synchronizing signal. In that case, the cycle of the horizontal synchronizing signal HS changes in timed relation with the semiconductor integrated circuit 1 outputting lines 521 through 522. In response to such a change in the cycle, the PLL circuit in the display device may be unlocked, and it takes some time for the PLL circuit to be locked again. The number of lines which are output prior to the first line having active pixels and which have the same number of pixels as the first line in question is established in accordance with a delay time that elapses from the time the PLL circuit is unlocked until it is locked again. The number of lines may be as low as "1" depending on the performance of the PLL circuit. In this embodiment, the number of pixels on each of lines 522 through 525 is made the same as that on line 1, so that an unlocked PLL circuit is to be locked again at the moment the display device starts scanning line 1 of the next frame following the last line 525 of the current frame. This prevents image disturbances on the display screen when the display device displays line 1 because a stabilized horizontal synchronizing signal is acquired in correspondence with line 1.

Likewise, of the lines 1 through 480 having the active pixels, the last lines 477 through 480 may have pixels whose count differs from that on any of the other lines 1 through 476 in view of the delay time between an unlocked state and a subsequent locked state of the PLL circuit. The number of lines 477 through 480 is the same as the number of lines 522 through 525 after which line 1 is output. The video signal structure shown in FIG. 7 is equivalent to that of FIG. 2B as the latter is shifted four lines in descending order of line numbers.

Fourth Embodiment

The video signal V3 for the frame frequency of 60 Hz is not limited to the frame structure of FIG. 2B or to that of FIG. 7. Many other alternative structures (i.e., formats) may be devised as long as the rules (A) and (B) are complied with. What follows is a description of a fourth embodiment in which the lines may be grouped as desired, the number of lines in each group may be varied as needed, and the number of pixels per line in each group may be altered as required.

Figure 8:
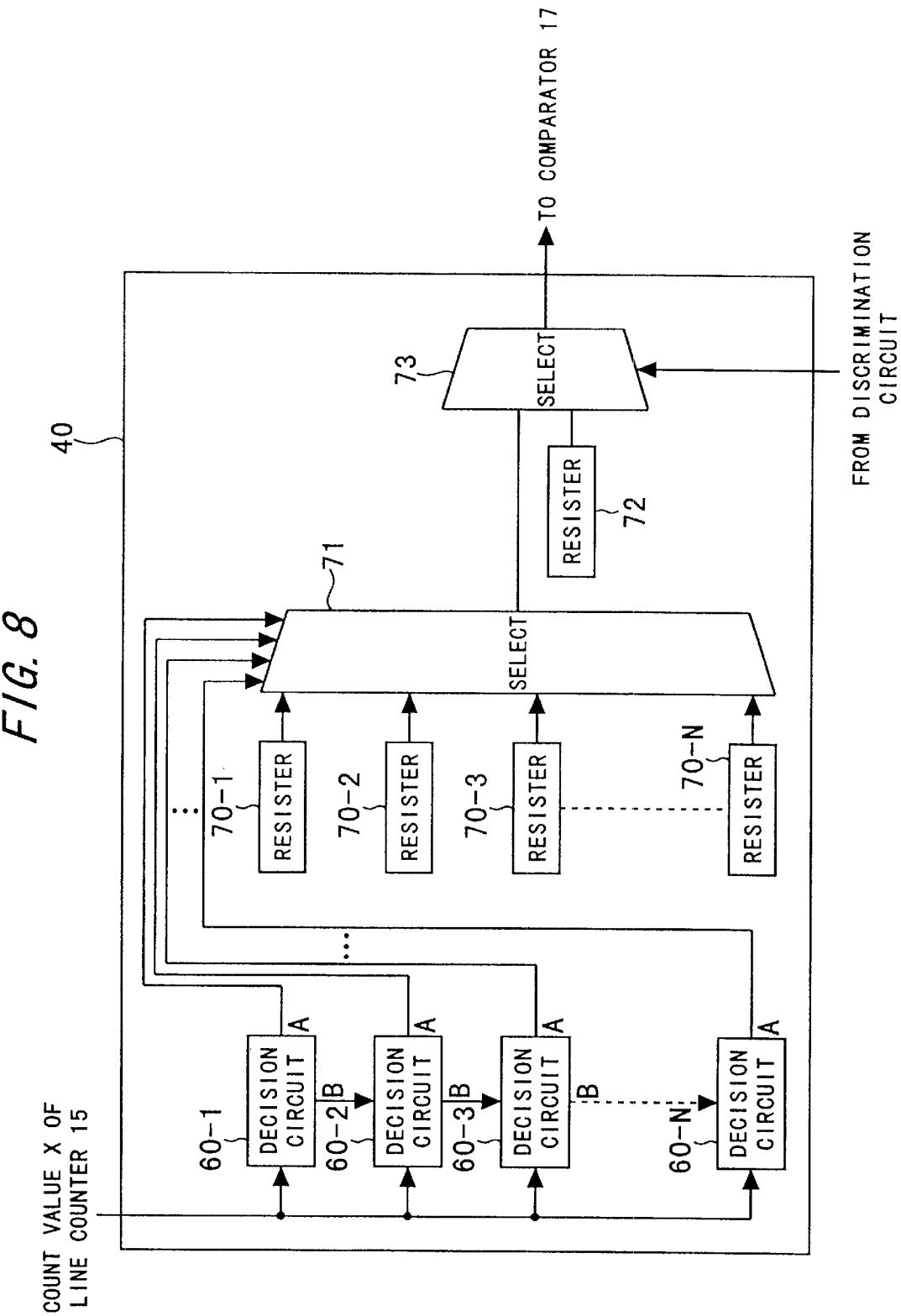
FIG. 8 is a block diagram of a second signal generation circuit 40 in a controller 12 of a fourth embodiment of this invention.

A semiconductor integrated circuit 1 practiced as the fourth embodiment comprises a second signal generation circuit 40 shown in FIG. 8. The other components of the fourth embodiment are the same as those of the first embodiment. The second signal generation circuit 40 includes a plurality of decision circuits 60-1 through 60-N, and a plurality of registers 70-1 through 70-N which are furnished corresponding to the multiple decision circuits and which may have data written thereto.

Figure 9A:
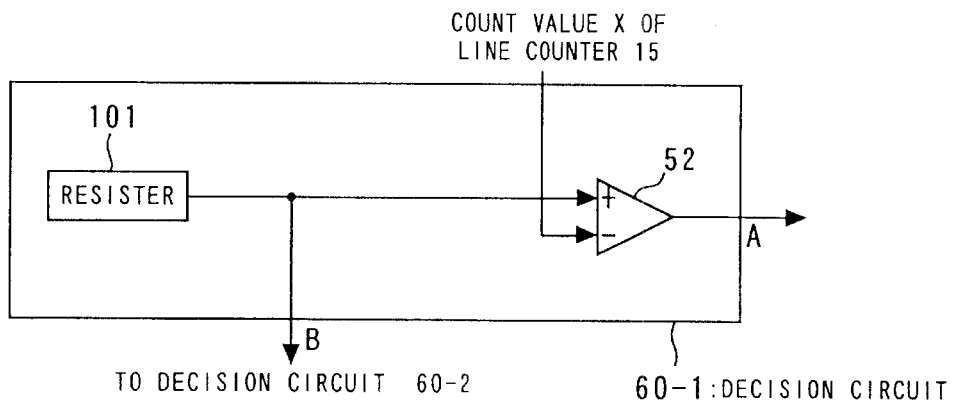
FIGS. 9A and 9B are block diagrams of decision circuits 60-1 through 60-N in the second signal generation circuit 40 of FIG. 8.
Figure 9B:
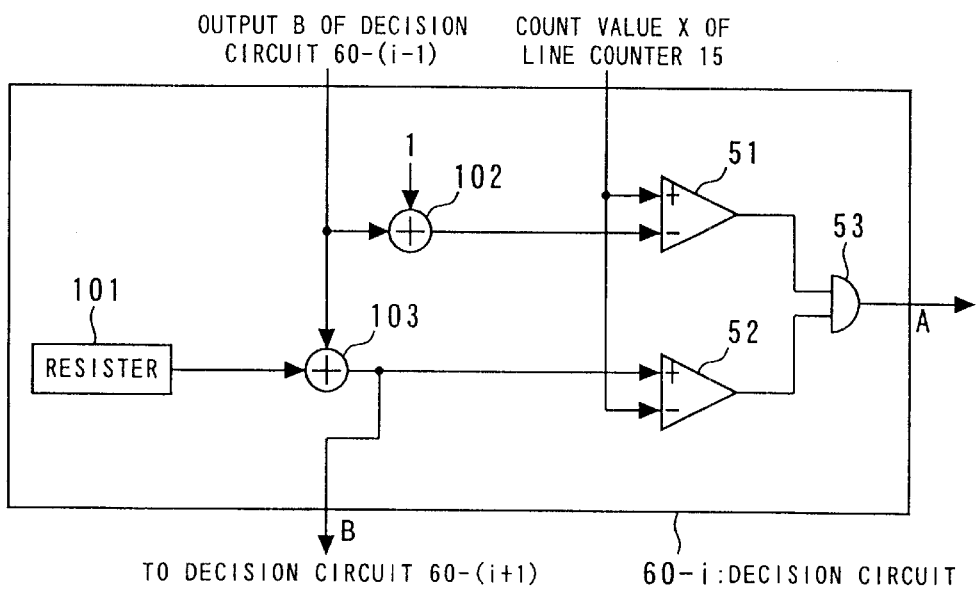

The decision circuit 60-1 is structured as illustrated in FIG. 9A. Each of the decision circuits 60-2 through 60-N is constituted as shown in FIG. 9B.

The decision circuit 60-1 has a writable register 101 and a comparator 52. The comparator 52 compares a value input on the positive (+) side with a value input on the negative (−) side. If the positive-side input value is found to be equal to or more than the negative-side input value, the comparator 52 outputs "1." If the positive-side input value is judged to be smaller than the negative-side input value, the comparator 52 outputs "0." In other words, the comparator 52 outputs "1" if the value in the register 101 is equal to or more than the count value from the line counter 15; otherwise the comparator 52 outputs "0." The value output by the comparator 52 is sent to a selector 71 as a judgment result A. The value in the register 101 is output to the downstream decision circuit 60-2 as an output B.

Each of the decision circuits 60-2 through 60-N comprises a writable register 101, adders 102 and 103, comparators 51 and 52, and an AND circuit 53.

In each of the decision circuits 60-2 through 60-N (generically called the decision circuit 60-i hereunder), the adder 102 adds data representing "1" and the output B from the upstream decision circuit 60-(i−1). The adder 103 adds the value of the register 101 and the output B from the upstream decision circuit 60-(i−1). The result of the addition by the adder 103 is sent as an output B to the downstream decision circuit 60-(i+1). The output B is not needed if the decision circuit 60-i is located at the last stage, i.e., if it is the last decision circuit 60-N.

The comparator 51 compares a value input on the positive (+) side with a value input on the negative (−) side. If the positive-side input value is found to be equal to or more than the negative-side input value, the comparator 51 outputs "1." If the positive-side input value is judged to be smaller than the negative-side input value, the comparator 51 outputs "0." That is, the comparator 51 outputs "1" if the count value of the line counter 15 is equal to or greater than the result of the addition by the adder 102; otherwise the comparator 51 outputs "0." The comparator 52 compares the count value of the line counter 15 with the result of the addition by the adder 103. If the sum is judged to be equal to or greater than the count value, the comparator 52 outputs "1"; otherwise the comparator 52 outputs "0." The AND circuit 53 ANDs the output values from the comparators 51 and 52, and outputs the result A of the AND operation to the selector 71.

Returning to FIG. 8, the second signal generation circuit 40 comprises the selector 71, a writable register 72, and a selector 73. The selector 71 selects and outputs the value in that one of the registers 70-1 through 70-N which corresponds to the decision circuit outputting "1." When the discrimination signal is "1," the selector 73 selects and outputs the output of the selector 71; when the discrimination signal is "0," the selector 73 selects and outputs the value of the register 72.

Where the video signal V3 represents an image having the frame frequency of 59.94 Hz, the value in the register 72 is always output to the comparator 17. Thus each of all lines making up one frame has the number of pixels indicated by data in the register 72. In the example of FIG. 2A, a value representing a "858" is set to the register 72.

Figure 10:
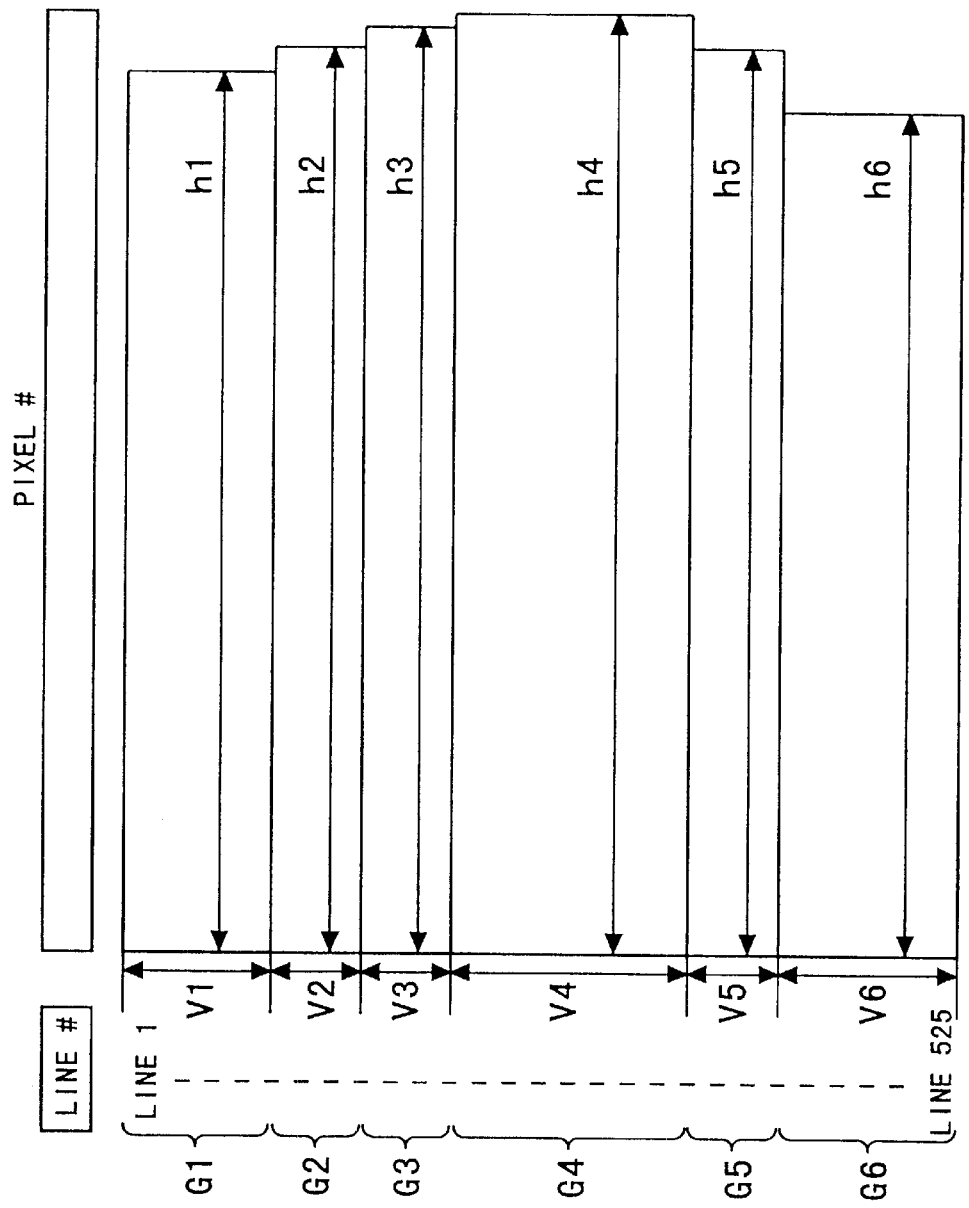
FIG. 10 is a schematic view showing a structure of a single frame of a video signal output by a semiconductor integrated circuit of the fourth embodiment.

It is assumed that, one frame of the video signal V3 is desired to be formed as shown in FIG. 10, when the signal represents an image having the frame frequency of 60 Hz. It is also assumed that as depicted in FIG. 10, a total of 525 lines constituting a single frame is divided into a plurality of groups, say six groups G1 through G6, and that the numbers of lines in the groups G1 through G6 are denoted by values V1 through V6 respectively, each of V1 through V6 being at least "1." Furthermore, it is assumed that the number of pixels on the lines in each group is the same and that the numbers of pixels per line in the groups G1 through G6 are represented by values h1 through h6 respectively.

In the case above, the registers 101 of the decision circuits 60-1 through 60-6 need only be set with the values V1 through V6 respectively, and the registers 70-1 through 70-6 with the values h1 through h6 respectively. When the values V1 through V6 are placed into registers 101 of the decision circuits 60-1 through 60-6, the groups G1 through G6 are set so as to correspond to the decision circuits 60-1 through 60-6. In this case, the decision circuits 60-1 through 60-6 each check to see if the line number indicated by the count value X of the line counter 15 belongs to each of the groups G1 through G6.

In the decision circuit 60-1, the comparator 52 indicates whether the count value X of the line counter 15 falls within a range from the first number "1" to the last number "V1" in the group G1. If the count value X is judged to be within the range, the comparator 52 outputs a detection signal A denoting "1."

In the decision circuit 60-2, the output of the adder 102 indicates the first number (V1+1) in the group G2, and the adder 103 outputs the last number (V1+V2) in the group G2. Thus the comparator 51 outputs "1" only if the count value X of the line counter 15 is equal to or greater than the first number (Vi+1) in the group G2; the comparator 52 outputs "1" only if the count value X of the line counter 15 is equal to or less than the last number (V1+V2) in the group G2. Given these outputs, the AND circuit 53 performs an AND operation to determine whether the count value X falls within the range from the first to the last number of the group G2. The AND circuit 53 outputs a detection signal A representing "1" only if the count value X is judged to be within the range.

Likewise, in the decision circuit 60-i (i=3 through 6), the output of the adder 102 indicates the first number (V1+ . . . +V(i−1)+1) in the corresponding group Gi. The adder 103 indicates the last number (V1+ . . . +Vi) in the group Gi. Thus the comparator 52 outputs "1" only if the count value X of the line counter 15 is equal to or greater than the first number of the group Gi; the comparator 51 outputs "1" only if the count value X of the line counter 15 is equal to or less than the last number of the group Gi. Given these outputs, the AND circuit 53 performs an AND operation to determine whether the count value X falls within the range from the first to the last number of the group Gi. The AND circuit 53 outputs a detection signal A representing "1" only if the count value X is judged to be within the range.

The selector 71 selects and outputs the value placed in that register among the registers 70-1 through 70-6 which corresponds to the decision circuit outputting "1." The decision circuit 60-1 through 60-6 are set for mutually exclusive ranges, each being used to determine whether the count value X falls within a specifically established range. Thus only one of the decision circuit 60-1 through 60-6 outputs "1." The selector 71 selects and outputs the output of the registers 70-1 through 70-6. Because the registers 70-1 through 70-6 are set with values representing h1 through h6 respectively, the selector 72 outputs the number of pixels per line in the group to which the count value X of the line counter 15, i.e., the line number in question belongs.

Where the number of groups is smaller than the number of the decision circuits as in the above example, the registers 101 in the remaining decision circuits 60-7 through 60-N need only be set each with a suitable default value which always maintains the output of the circuits 60-7 through 60-N to be "0." It follows that the selector 71 will never select the value in any of the registers 70-7 through 70-N. Illustratively, the value "0" need only be set to all registers 101 in the decision circuits 60-7 through 60-N. In that case, the adder 102 in each decision circuit outputs a value (Z+1), i.e., the number of lines per frame (e.g., Z) plus 1. Since the count value X of the line counter 15 will not exceed Z, the comparator 51 will never output "1." The registers 70-7 through 70-N need only be set each with a suitable default value such as "0."

If a CPU of a different semiconductor chip or a built-in CPU of the semiconductor integrated circuit 1 is provided, that CPU may perform write operations to the registers 101 of the decision circuits 60-1 through 60-N, to the registers 70-1 through 70-N, and to the register 72 on one of three occasions: when power is applied to the system, when a reset signal is entered, or when frame frequencies of the video signal are changed.

Figure 11:
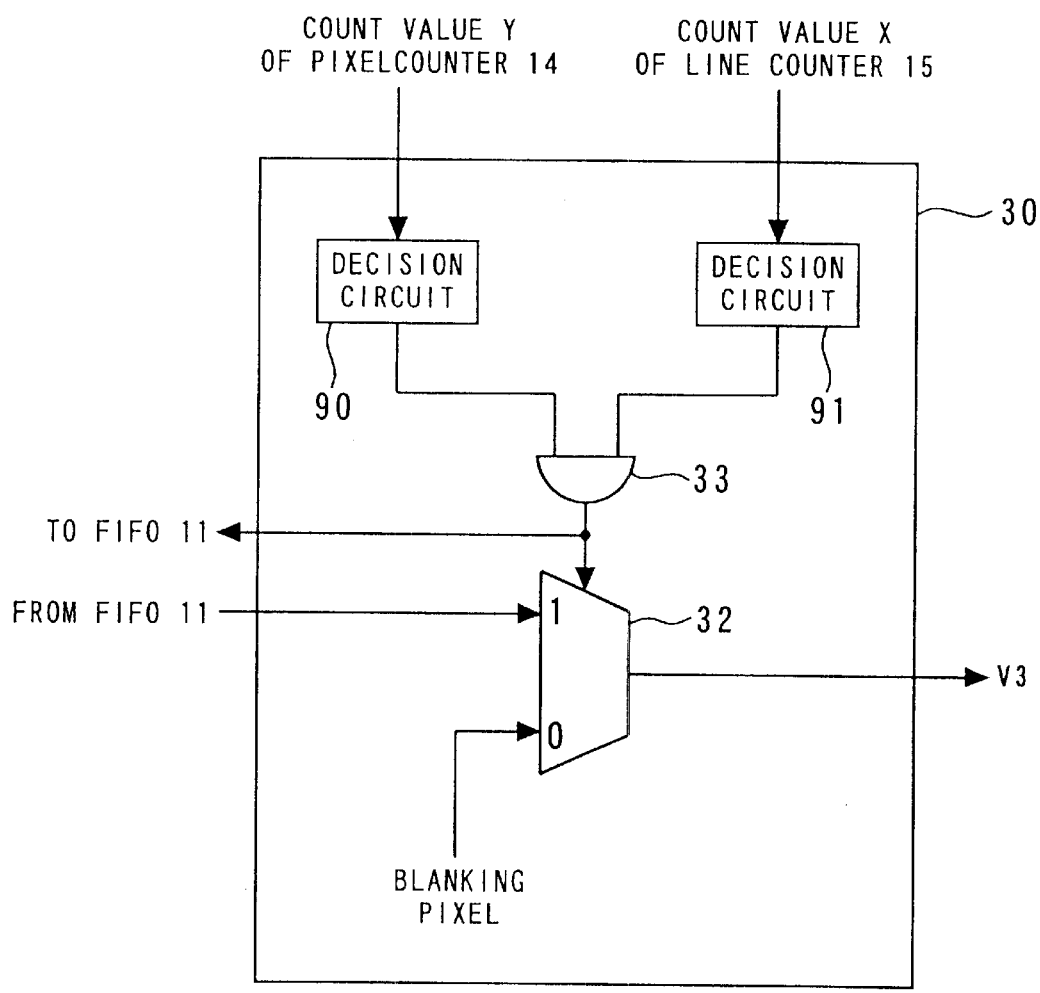
FIG. 11 is a block diagram of a first signal generation circuit 30 in a controller 12 of the fourth embodiment.

The first signal generation circuit 30 is structured as shown in FIG. 11, and comprises decision circuits 90 and 91. The decision circuit 90 determines whether the count value Y from the pixel counter 14 contains the number of a pixel into which an active pixel is to be inserted. If such a pixel number is judged to be contained, the decision circuit 90 outputs "1"; otherwise the decision circuit 90 outputs "0." The decision circuit 91 determines whether the count value X from the line counter 15 contains the number of a line that should possess active pixels. If such a line number is judged to be contained, the decision circuit 91 outputs "1"; otherwise the decision circuit 91 outputs "0." The results of the judgments by the decision circuits 90 and 91 are input to the AND circuit 33. The other AND circuits 33 and selectors 32 are identical to those shown in FIG. 4.

In the above makeup, settings of the registers may be changed in the manner described below to alter the single-frame structure of the video signal.

Up to N groups may be established as desired in accordance with the values placed in the registers 101 of the decision circuits 60-1 through 60-N.

The values in the registers 101 in at least predetermined two of the decision circuits 60-1 through 60-N are used to determine the number of lines belonging to each of the plurality of groups established above. The number of lines may be altered as needed by changing values in these registers 101.

The values in at least predetermined two of the registers 70-1 through 70-N are used to determine the number of pixels per line in each of the multiple groups established. The number of pixels per line may be modified as desired by changing values in the registers 70-1 through 70-N.

In the fourth embodiment, the register 101 of each decision circuit contains the number of lines in each group. Alternatively, the registers 101 may have other values. For example, if the value denoting the last line number of a given group is held in the corresponding register 101, the number of lines in each group may still be determined. The number of lines in a given group is equal to its last line number minus the last line number of the preceding group. Thus the value in the register 101 of the preceding decision circuit plus "1" is input to the negative (−) side of the comparator 51 in each of the decision circuits 60-2 through 60-N; the value in the register 101 of the current decision circuit is input to the positive (+) side of the comparator 52 in each of the decision circuits 60-2 through 60-N. There is no need to change the contents of the decision circuit 60-1.

The plurality of decision circuits 60-2 through 60-N may each be furnished with two registers. One of the two registers may be set with the first line number of each group, and the other register with the last line number of each group. Such settings also determine the number of lines in each group. In that case, the value in one register is input unchanged to the negative (−) side of the comparator 51, and the value in the other register is input unmodified to the positive (+) side of the comparator 52 (structured in the same manner as in a decision circuit in FIG. 15, to be described later). There is no need to change the contents of the decision circuit 60-1. Thus one or two registers furnished in each decision circuit may determine the number of lines in each group.

In a variation of the setup in FIG. 8, the registers 72 and the selector 73 may be removed and the value of the selector 71 may be output to the comparator 17.

Where the semiconductor integrated circuit 1 outputs a video signal in which all lines 1 through 525 have the same number of pixels each as shown in FIG. 2A, either a CPU of a different semiconductor chip or a built-in CPU of the semiconductor integrated circuit 1 sets to the register 101 of the decision circuit 60-1 a value denoting the last line number "525" of a given frame, and sets to the register 70-1 a value representing the number of pixels "858" per line. The settings are established on any one of three occasions: when power is applied to the system, when a reset signal is entered, or when frame frequencies are changed. The registers 101 in the other decision circuits 60-2 through 60-N are each set with a value (e.g., "0") preventing the decision circuit in question from outputting a decision result denoting "1." Because the decision circuit 60-1 always outputs "1" and the other decision circuits output "0" continuously, the selector 71 perpetually outputs the value of the register 70-1 to the comparator 17. In such a case, there is no need for the discrimination circuit 13 shown in FIG. 2.

Fifth Embodiment

The fifth embodiment is constituted by a semiconductor integrated circuit that permits changing, as desired, of the range of line numbers and that of pixel numbers into which to insert active pixels.

Figure 12:
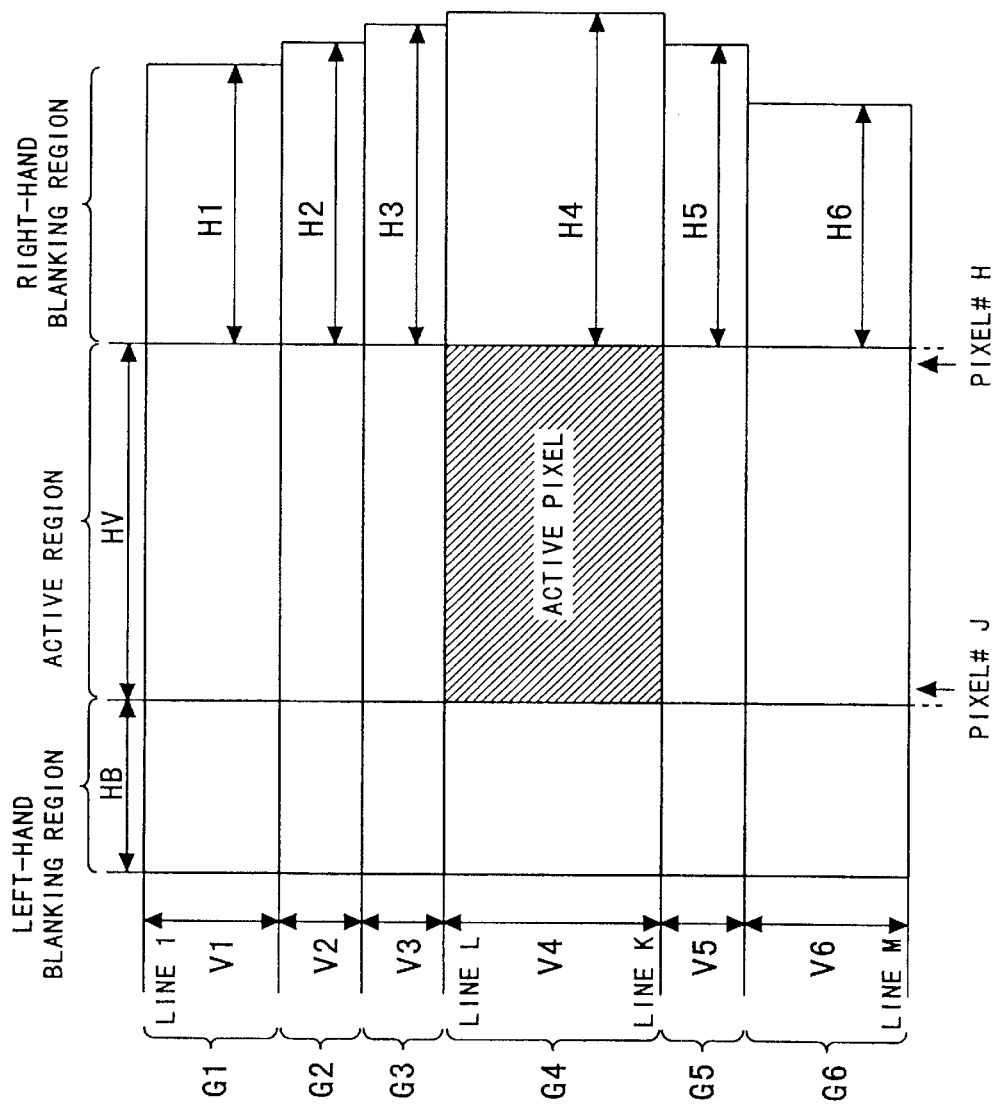
FIG. 12 is a schematic view showing a structure of a single frame of a video signal output by a semiconductor integrated circuit practiced as a fifth embodiment of this invention.

FIG. 12 shows a single-frame structure of a progressive digital image having the frame frequency of 60 Hz. As in the example of FIG. 10, one frame has 525 lines and groups G1 through G6 have V1 through V6 lines respectively. The pixels on each line are divided into a left-hand blanking region, an active region and a right-hand blanking region. Each line has as many as HB pixels in the left-hand blanking region that begins at pixel number 1 and HV pixels in the active region that begins at pixel number (HB+1). The number of pixels in the right-hand blanking region beginning at pixel number (HB+HV+1) varies from line to line. In the right-hand blanking region, the lines belonging to the groups G1 through G6 have as many as H1 through H6 pixels respectively. Each of the values H1 through H6 is an integer of at least 1.

Active pixels are inserted into the active region on each of all lines L through K (as many as K−L+1) in, say, the group G4. All other pixels are blanking pixels.

Figure 13:
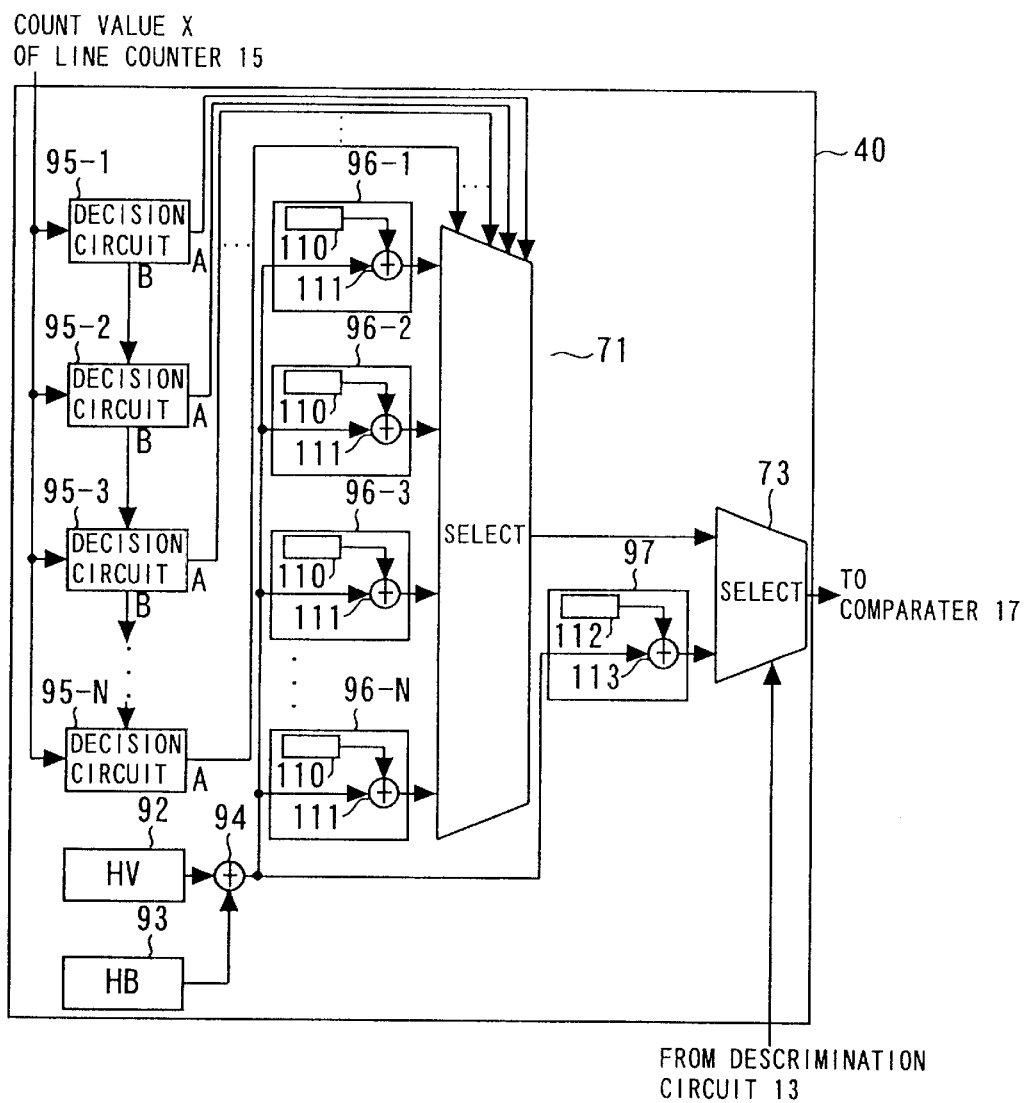
FIG. 13 is a block diagram of a second signal generation circuit 40 in the fifth embodiment.

The semiconductor integrated circuit 1 of the fifth embodiment has a second signal generation circuit 40 shown in FIG. 13. This second signal generation circuit 40 is characterized in that the registers 70-1 through 70-N and 72 of FIG. 8 are replaced by pixel count determination circuit 96-through 96-N and 97 and that registers 92 and 93 as well as an adder 94 are additionally provided. The remaining components of the structure are the same as those in the fourth embodiment.

The registers 92 and 93 are used to designate an active region and a left-hand blanking region, accommodating pixel counts HV and HB respectively. The adder 94 adds up values placed in the registers 92 and 93, and outputs the value (HB+HV).

Each of the determination circuits 96-1 through 96-N outputs the number of pixels per line in each of the groups established by the decision circuits 60-1 through 60-N. Each determination circuit comprises a writable register 110 and an adder 111. The register 110 is used to designate the right-hand blanking region of the corresponding group, and holds the number of pixels belonging to the right-hand blanking region on the lines. The adder 111 adds up the sum from the adder 94 and the value placed in the register 110. The result of the addition by the adder 111 amounts to the number of pixels per line in the corresponding group. In the example of FIG. 12, the registers 101 of the decision circuits 95-1 through 95-6 are set with values V1 through V6 respectively as in the case of FIG. 10; the registers 101 of the other decision circuits may each be set with "0." Values H1 through H6 may be set to the determination circuits 96-1 through 96-6 respectively, while some suitable default values may be written to the determination circuits 96-7 through 96-N.

Likewise the determination circuit 97 comprises a register 112 and an adder 113. The register 112 accommodates the number of pixels belonging to the right-hand blanking region on the lines of a video signal having the frame frequency of 59.94 Hz. On all lines of the video signal with the frame frequency of 59.94 Hz, the number of pixels belonging to the right-hand blanking region remains constant. The adder 113 adds up the sum from the adder 94 and the value from the register 112. The result of the addition by the adder 113 represents the number of pixels per line of the video signal having the frame frequency of 59.94 Hz.

Thus if the video signal has the frame frequency of 59.94 Hz, the second signal generation circuit 40 outputs the value coming from the determination circuit 97. If the video signal has the frame frequency of 60 Hz, one of the determination circuits 96-1 through 96-N is selected, and the selected circuit outputs the number of pixels on the line indicated by the count value X of the line counter.

Figure 14:
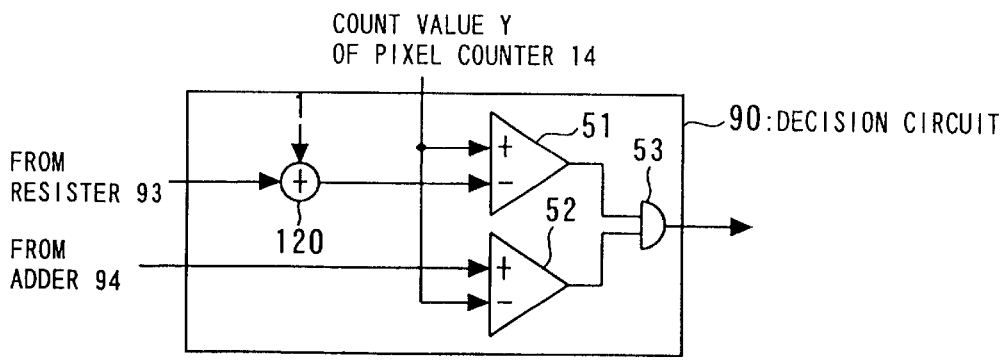
FIG. 14 is a block diagram of a decision circuit 90 in a first signal generation circuit 30 of the fifth embodiment.

The first signal generation circuit 30 of the fifth embodiment is structurally identical to its counterpart in FIG. 11. FIG. 14 is a block diagram of a decision circuit 90 in the fifth embodiment. The decision circuit 90 includes an adder 120, comparators 51 and 52, and an AND circuit 53.

The adder 120 adds "1" to the value of the register 93 shown in FIG. 13. The result of the addition denotes the number of the first pixel into which an active pixel is inserted. The sum from the adder 120 is input to the negative (−) side of the adder 51. The result of the addition by the adder 94 in FIG. 13 designates the number of the last pixel into which an active pixel is inserted. The sum from the adder 94 is input to the positive (+) side of the comparator 52. Thus the decision circuit 90 determines whether the pixel number indicated by the count value Y of the pixel counter 14 is included in the active region. If the indicated pixel number is judged to be within the active region, the decision circuit 90 outputs "1"; if the pixel number is not included in the active region, the decision circuit 90 outputs "0."

Figure 15:
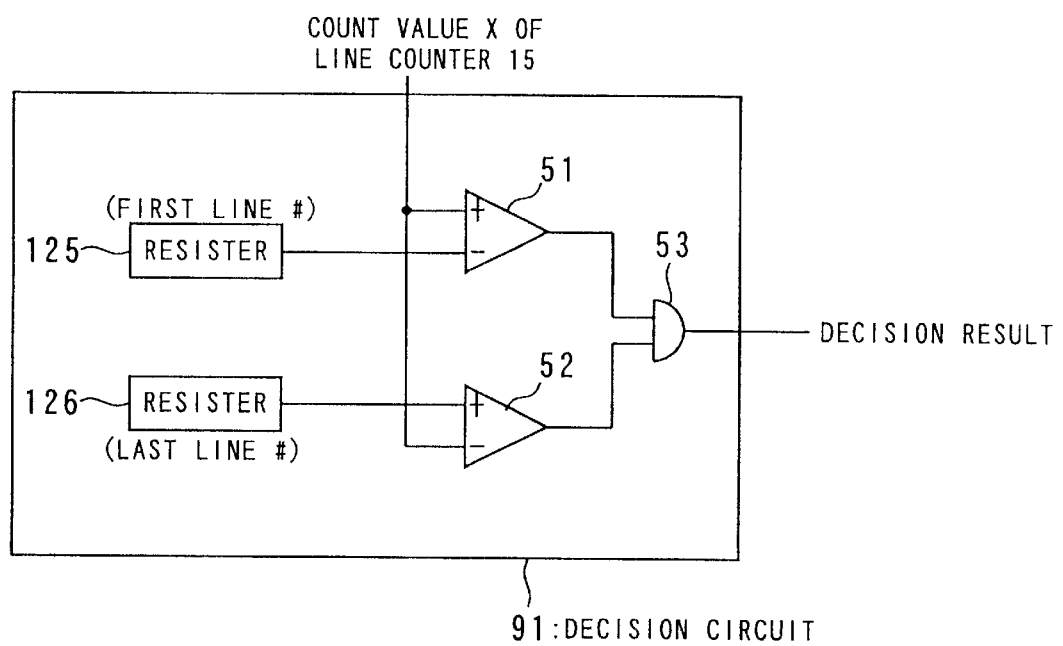
FIG. 15 is a block diagram of a decision circuit 91 in the first signal generation circuit 30 of the fifth embodiment.

FIG. 15 illustrates a structure of a decision circuit 91. The decision circuit 91 comprises writable registers 125 and 126, an adder 120, comparators 51 and 52, and an AND circuit 53.

The register 125 is set with a value denoting the number of the first line having active pixels, and the set value is input to the negative (−) side of the comparator 51. The register 126 is set with a value indicating the number of the last line having active pixels, and that set value is input to the positive (+) side of the comparator 52. On the basis of the values placed in the registers 125 and 126, the decision circuit 91 establishes a range of the numbers of lines into which to insert active pixels, and checks to see if the count value X of the line counter 15 falls within the established range. If the count value X is judged to be within the range, the decision circuit 91 outputs "1"; if the count value X is outside the range, the decision circuit 91 outputs "0." In the example of FIG. 12, values "L" and "K" are placed into the registers 125 and 126 respectively.

If a CPU of a different semiconductor chip or a built-in CPU of the semiconductor integrated circuit 1 is provided, that CPU may perform write operations to the registers 92 and 93, to the registers 101 of the decision circuits 95-1 through 95-N, to the registers 110 of the determination circuits 96-1 through 96-N, to the register 112 of the determination circuit 97, and to the registers 125 and 126 of the decision circuit 91, on one of two occasions: when power is applied to the system, or when a reset signal is entered.

The single-frame structure of the video signal may be altered as follows by changing settings of the registers.

Specifically, the set value in the register 93 causes the decision circuit 90 to determine the range of the left-hand blanking region. That is, the position of the first pixel into which to insert an active pixel on a given line is determined based on the value in the register 93. It follows that changing the value in the register 93 permits varying, as desired, of the range of the left-hand blanking region or the position of the first pixel into which to insert an active pixel. If the left-hand blanking region is not necessary, the register 93 need only be set with "0."

The set value in the register 92 is used to determine the number of active pixels to be inserted into a given line. That is, the number of the first pixel in the right-hand blanking region is determined based on the value in the register 92. This means that changing the value in the register 92 permits varying, as desired, of the number of active pixels to be inserted in a given line or the number of the first pixel in the right-hand blanking region.

The value in each of the registers 110 of the determination circuits 96-1 through 96-N is used to determine the range of the right-hand blanking region. That is, the number of pixels per line in each of a plurality of line groups is determined based on the value in the register 110. It follows that changing the value in the register 110 permits varying, as desired, of the range of the right-hand blanking region or the number of pixels per line in each group.

In the fifth embodiment, the value denoting the number of pixels included in an active region is placed into the register 92 in order to define the active region. However, this is not limitative of the invention. Alternatively, another value may be set to the register 92 to establish an active region. For example, the last pixel number H of the active region may be placed into the register 92 as shown in FIG. 12. In that case, the value in the register 92 may be set to the determination circuits 96-1 through 96-N and 97 in FIG. 13, and may be input to the positive (+) side of the comparator 52 in the decision circuit 90 of FIG. 14.

In the fifth embodiment, the value representing the number of pixels included in a left-hand blanking region is placed into the register 93 in order to define the left-hand blanking region. Alternatively, another value may be set to the register 93 to establish a left-hand blanking region. For example, the first pixel number J of the active region may be placed into the register 93 as shown in FIG. 12. In that case, the value in the register 93 may be input to the negative (−) side of the comparator 51 in the decision circuit 90 of FIG. 14. If the register 92 is set with the last pixel number H of the active region, then the set value of the register 92 may be input to the positive (+) side of the comparator 52.

Sixth Embodiment

The blanking regions are filled with blanking pixels, i.e., dummy pixels, that are irrelevant to the image being displayed. Alternatively, these blanking pixels may be replaced by significant data for output onto the display device.

Figure 16:
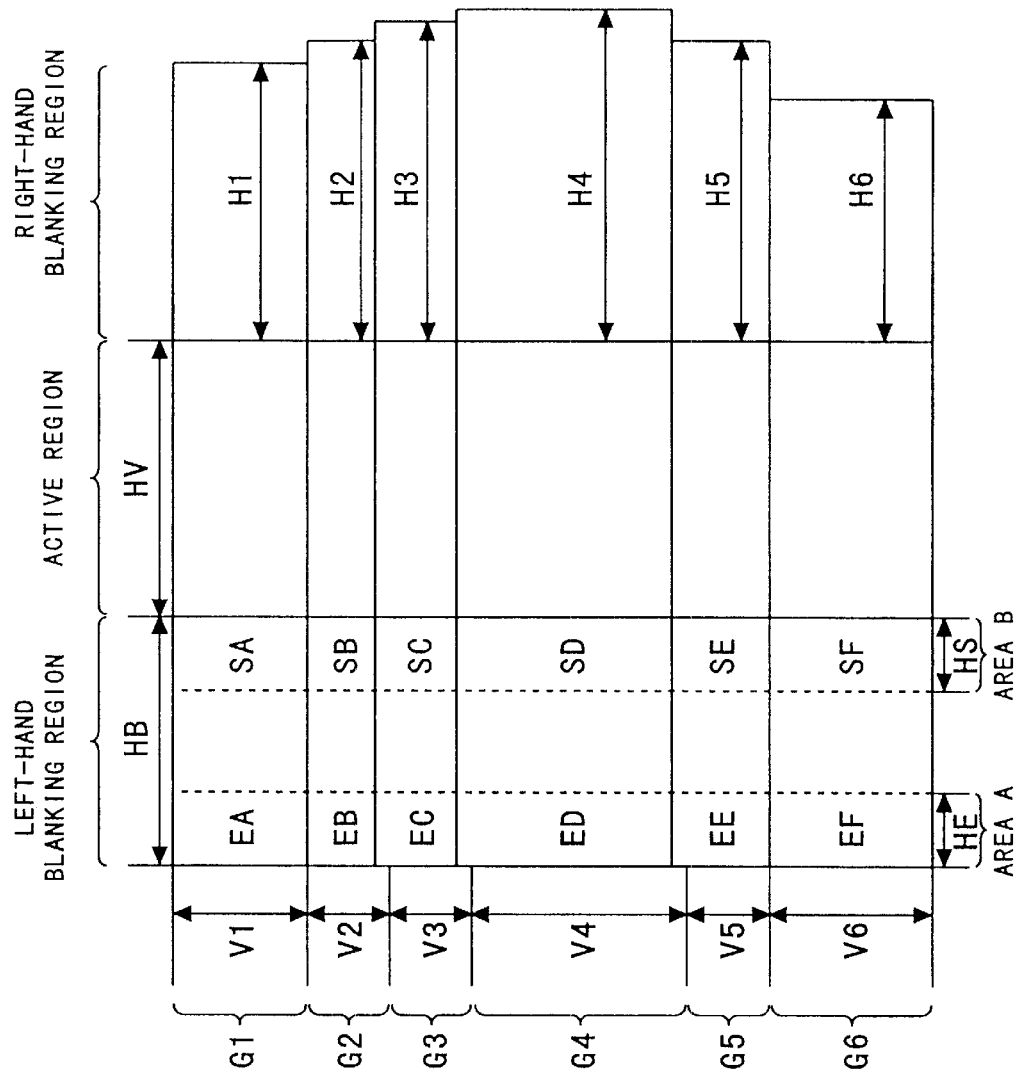
FIG. 16 is a schematic view showing a structure of a single frame of a video signal output by a semiconductor integrated circuit practiced as a sixth embodiment of this invention.

Illustratively, FIG. 16 shows an example in which data are inserted into areas A and B of a left-hand blanking region. On all lines, the area A accommodates as many as HE consecutively arranged items of data (called the data A hereunder) each constituted by the same number of bits as that of a pixel, and the area B holds HS successively arranged items of data (called the data B hereunder) each composed of the same number of bits as that of a pixel. The values HE and HS are an integer of at least 1 each.

The semiconductor integrated circuit 1 of the sixth embodiment outputs a video signal wherein predetermined data other than blanking pixels are inserted into blanking regions. The semiconductor integrated circuit 1 comprises a first signal generation circuit 30 shown in FIG. 17. The remaining components of the semiconductor integrated circuit 1 are the same as those of the fifth embodiment.

Figure 17:
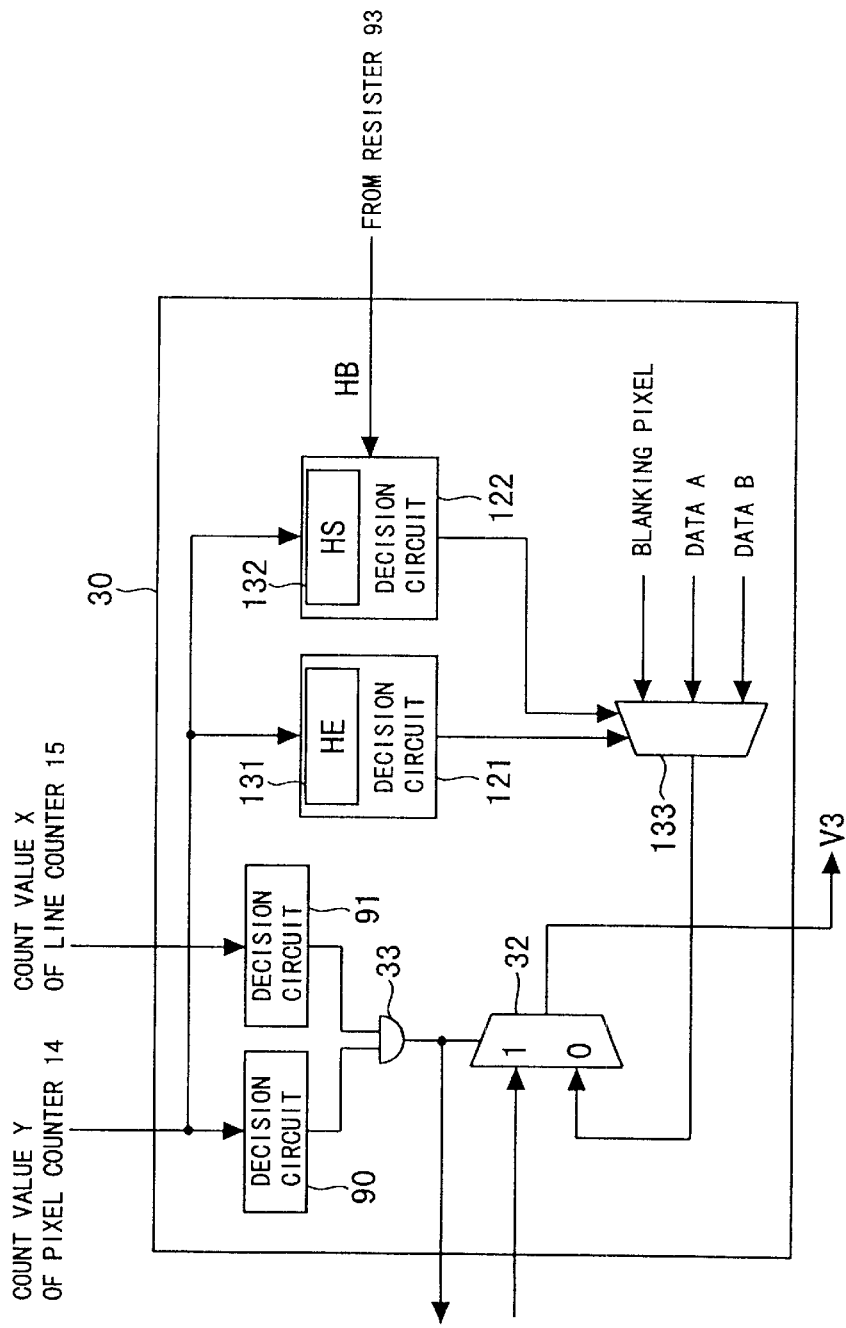
FIG. 17 is a block diagram of a first signal generation circuit 30 in the sixth embodiment.

The first signal generation circuit 30 shown in FIG. 17 is a variation of the setup in FIG. 11. The circuit 30 is implemented by supplementing the structure shown in FIG. 11 with decision circuits 121 and 122, registers 131 and 132, and a selector 133. The other components of the first signal generation circuit 30 are the same as those in the fifth embodiment.

The decision circuit 121 receives the count value Y of the pixel counter 14, and determines whether the pixel indicated by the count value Y is included in the area A shown in FIG. 16. The decision circuit 121 comprises a register 131 that holds a value specifying the area A. In this example, the number of pixels HE contained in the area A is set as the value designating the area A.

Figure 18A:
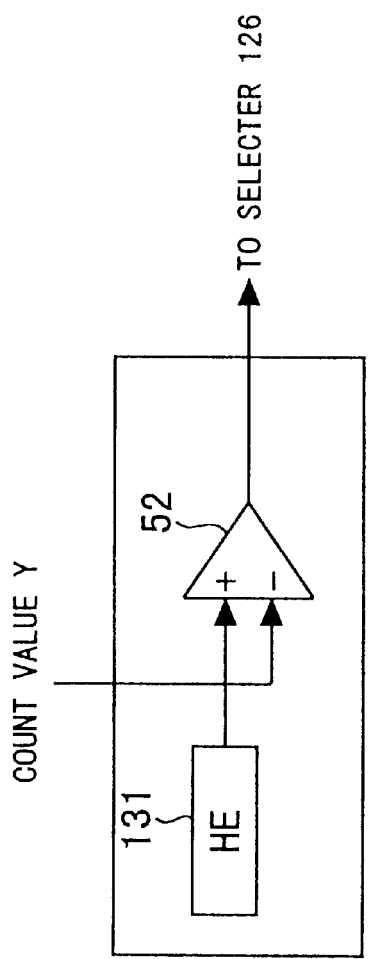
FIGS. 18A and 18B are block diagrams of decision circuits 121 and 122 in the first signal generation circuit 30 of FIG. 17.

The decision circuit 121 is structured as depicted in FIG. 18A, and has a comparator 52 that compares the value HE from the register 131 with the count value from the pixel counter 14. If the count value is judged to be equal to or less than the value HE, the comparator 52 outputs "1" indicating that the count value falls within the area A; otherwise the comparator 52 outputs "0" indicating the count value is outside the area A.

The decision circuit 122 receives the count value Y of the pixel counter 14 and determines whether the pixel designated by the count value Y is included in the area B. The decision circuit 122 has a register 132 that holds a value specifying the area B shown in FIG. 16. In this example, the number of pixels HS to be contained in an area B is set to the register 132 as the value designating that area B.

Figure 18B:
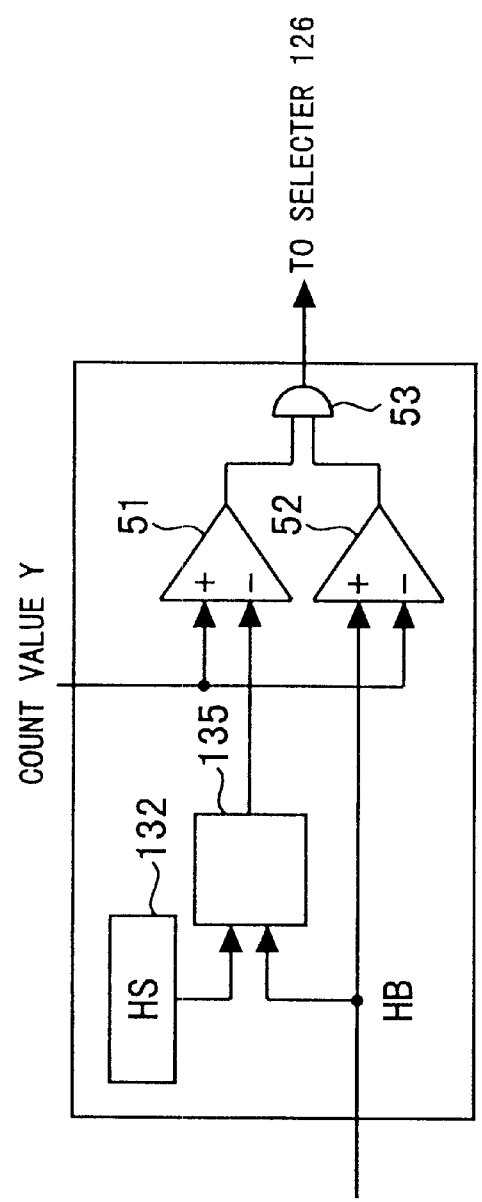

The decision circuit 122, structured as depicted in FIG. 18B, comprises a circuit 135 that calculates the smallest pixel number of the area B on the basis of the value HS placed into the register 132. Given the value HB from the register 93, the circuit 135 calculates the smallest pixel number of the area B as (HB−HS+1) and outputs the result to the negative (−) side of the comparator 51. The value HB in the register 93 is also input to the positive (+) side of the comparator 52. The value HB indicates the largest pixel number of the area B. Thus if the count value Y of the pixel counter 14 is greater than (HB−HS+1) and less than HB, then the comparators 51 and 52 as well as the AND circuit 53 combine to output "1" indicating that the count value X is included in the area B; otherwise the components output "0" indicating the count value X is not contained in the area B.

If the decision circuits 121 and 122 both output "0," the selector 126 selects and outputs blanking pixels; if the decision circuit 121 outputs "1" and decision circuit 122 outputs "0," the selector 126 outputs data A; if the decision circuit 122 outputs "1" and decision circuit 121 outputs "0," the selector 126 outputs data B. Because the decision circuits 121 and 122 never output "1" at the same time, the selector 126 is not structured to deal with "1" coming from the two decision circuits simultaneously.

Where the semiconductor integrated circuit 1 of the sixth embodiment is structured as described above, as many as HE items of data A are inserted consecutively into the area A on all lines, and HS items of data B are inserted successively into the area B on all lines. The remaining portion of the left-hand blanking region and the entire right-hand blanking region are filled with blanking pixels.

The registers 131 and 132 are both writable registers whose contents may be changed to establish as desired the number of data items to be inserted into the area A or B. If a CPU of a different semiconductor chip or a built-in CPU of the semiconductor integrated circuit 1 is provided, that CPU may perform write operations to the registers 131 and 132 on one of three occasions: when power is applied to the system, when a reset signal is entered, or when frame frequencies of the video signal are changed.

The areas into which to insert data that are neither active nor blanking pixels are determined as described above based on the values placed into the registers 131 and 132. This means that the register values may be altered to change the areas accordingly.

Alternatively, areas for accommodating inserted data may be determined by adopting the structure of FIG. 15 into the decision circuit 121 or 122. Specifically, the smallest pixel number of an area of interest may be set to the register 125, and the largest pixel number of the area to the register 126 shown in FIG. 15. The settings cause data to be inserted into the desired area within the blanking region.

Aside from one of the above-described examples in which the same data A of one item or a plurality of items successively arranged are inserted into the area A of all lines, those data may be alternatively different from each other depending on the lines. Furthermore, in addition to another of the above-described examples in which the same data B of one item or a plurality of items consecutively arranged are inserted into the area B of all lines, those data may also be alternatively different from each other depending on the lines.

Another alternative may involve inserting data into a part of all lines constituting a given frame. A further alternative may involve inserting data into either the area A or the area B.

Furthermore, as shown in FIG. 16, domains EA through EF corresponding to the area A of the groups G1 through G6 may be determined using six independent registers. In that case, the value to be placed into each of the six registers denotes the number of pixels to be contained in each of the domains EA through EF. This means that varying values in the registers permits changing, as desired, of the number of pixels in any of the domains EA through EF.

Likewise, domains SA through SF corresponding to the area B of the groups G1 through G6 may be determined using six independent registers. In this case, too, the value to be placed into each of the six registers denotes the number of pixels to be contained in each of the domains SA through SF. It follows that varying values in the registers permits changing, as desired, of the number of pixels in any of the domains SA through SF.

Seventh Embodiment

Each of the fourth through the sixth embodiment above has been shown incorporating registers in which to designate: the number of line groups derived from division of all lines, the number of lines in each group, the number of pixels per line in each group, and the ranges of blanking regions, active regions and data insertion regions. A suitable CPU has been shown setting the necessary values to the registers illustratively when power is applied to the semiconductor integrated circuit 1 or during initialization following the entry of a reset signal.

Alternatively, it may be arranged that default values are to be set to the registers in response to a power-on or to a reset signal. That is, every time power is applied or a reset signal is entered, fixed default values are to be set automatically to the registers. The default values should each be the value of the highest likelihood for the register in question. As needs come up, any of these default values in the registers may be modified by the CPU on any one of occasions as follows: upon initialization of the semiconductor integrated circuit 1 following the power on or the entry of a reset signal, or when frame frequencies are changed. Such measures increase the possibility of dispensing with software for setting values to the registers. This alleviates the burdens of software development on users of the semiconductor integrated circuit.

The major benefits of the present invention described above are summarized as follows:

According to the first aspect of the present invention, when the semiconductor integrated circuit outputs a video signal, lines are divided into a plurality of groups each containing at least two consecutive lines. The lines included in each line group are arranged to have the same number of pixels, and the number of pixels per line is made different between any adjacent two of the multiple line groups. The number of pixels per line is prevented from varying abruptly through the provision of a plurality of groups not containing lines having active pixels. This forestalls image disturbances during display of a video signal wherein the number of pixels differs between lines.

According to the other aspect of the present invention, the same number of pixels is provided to all lines having active pixels corresponding to the image portions actually displayed on the screen. In such a case, the horizontal retrace cycle remains unchanged as long as those image portions are scanned by the display device. This arrangement further inhibits image disturbances. According to the other aspect of the present invention, any adjacent two of the plurality of line groups are subject to a pixel count difference of 1 per line therebetween. in this case, the change in the number of pixels per line is minimized. This further suppresses image disturbances.

When the semiconductor integrated circuit outputs a first and a second video signal having different frame frequencies, it may be arranged that the value obtained by multiplying the frame frequency of the first video signal by the total pixel count of the first video signal is to be equal to the value acquired by multiplying the frame frequency of the second video signal by the total pixel count of the second video signal. This arrangement allows the first and the second video signal to be output using a clock signal of a single frequency. It follows that only one oscillator is needed to generate the clock signal in question.

According to the other aspect of the present invention, prior to the first line of the lines having active pixels, one or more lines each having the same number of pixels as the first line may be output. This measure suppresses image disturbances when the display device uses a PLL circuit to reestablish synchronization by receiving the horizontal synchronizing signal from the semiconductor integrated circuit.

According to the other aspect of the present invention, the semiconductor integrated circuit comprises a plurality of registers that hold values for determining the number of lines contained in each of a plurality of line groups. The number of lines constituting each of the line groups involved may be varied as desired by changing values in the registers. That is, the inventive semiconductor integrated circuit is capable of addressing the need for altering the number of lines in any line group desired.

According to the other aspect of the present invention, there may be further provided a plurality of registers that hold values for determining the number of pixels per line in each of the line groups involved. This allows the number of pixels per line in any line group to be varied through changing of the value of the corresponding register.

According to the other aspect of the present invention, the registers may be arranged to be set automatically with their default values every time power is applied or whenever a reset signal is entered. This reduces the need to effect software-based processing explicitly to write values to the registers.

According to the other aspect of the present invention, there is provided a register that holds a value for determining the first pixel position into which to insert an active pixel on any line having active pixels. Changing the value in this register varies as desired the first pixel position into which to insert an active pixel.

According to the other aspect of the present invention, there is also provided a register that holds a value for determining the number of active pixels on any line having active pixels. Changing the value in this register varies as desired the number of active pixels on a given line.

According to the other aspect of the present invention, there are provided registers that hold values for determining pixel numbers of one or more pixels into which to insert predetermined data on at least one of a plurality of lines. Changing values in any of the registers varies as desired the pixel number of the pixel into which to insert predetermined data. If there are provided two registers that hold values for determining a plurality of pixel numbers of pixels into which to insert active pixels, then changing the values in the two registers will vary as desired the pixel numbers of the pixels into which active pixels are to be inserted.

According to the other aspect of the present invention, the semiconductor integrated circuit comprises: a pixel counter for counting up a clock signal so as to output a pixel number for each line, a comparator for comparing the count value of the pixel counter with a comparative value, a line counter for counting up a match signal from the comparator in order to output a line number of each line, and a controller for supplying the comparative value to the comparator.

The controller includes a plurality of decision circuits for which mutually exclusive ranges are set and which judge whether the count value of the line counter falls within any one of the established ranges. The controller also has a first selector which receives a plurality of mutually exclusive values and selects one of them in accordance with the judgments by the decision circuits. The selected value is output as a comparative value to a first comparator. The plurality of mutually exclusive values indicate pixel numbers per line between different lines. The line counter counts the line number correctly even if the number of pixels differs from line to line. These measures allow a single screen made of a plurality of lines to be divided into a plurality of groups each constituted by lines having the same number of pixels each.

According to the other aspect of the present invention, the decision circuits are each furnished with a first register and, based on the value in that register, are each set for a range in which a judgment is made. Thus changing values in the registers permits varying, as desired, of any of the ranges for the decision circuits to make judgments in. The number of lines included in each line group may also be modified by varying register values.

According to the other aspect of the present invention, the controller has a plurality of second registers furnished corresponding to the multiple decision circuits. The first selector selects and outputs any of the values placed in the plurality of second registers. The plurality of values indicate each the number of pixels per line in the corresponding line group. Thus changing values in the registers allows the number of pixels per line to be changed for a given group.

According to the other aspect of the present invention, a second selector is provided to select the output of the first selector if the output video signal is a first video signal. The second selector selects a predetermined value if the output video signal is a second video signal having a frame frequency different from that of the first video signal. This allows the inventive semiconductor integrated circuit selectively to output the second video signal in which all lines have the same number of pixels.

According to the other aspect of the present invention, the controller has an additional decision circuit which, on receiving a count value from the pixel counter, judges whether the received count value falls within an established range. The controller also includes a third selector which, based on the result of the judgment by the additional decision circuit, selectively outputs one of two kinds of pixels: active pixels representing those portions of the video signal which are to be displayed on the screen of the display device, or pixels other than the active pixels. The additional decision circuits includes a third register that holds a value specifying a pixel number range in which to make the judgment. Changing the value in the third register permits varying, as desired, of the range of pixel numbers of pixels into which to insert active pixels.

Further, the present invention is not limited to these embodiments, but variations and modifications may be made without departing from the scope of the present invention.

The entire disclosure of Japanese Patent Application No. Hei 11-256844 filed on Sep. 10, 1999 including specification, claims, drawings and summary are incorporated herein by reference in its entirety.

What is claimed is:

1. A semiconductor integrated circuit for outputting a first video signal which corresponds to a screen and which has a plurality of pixels on each of a plurality of lines constituting said screen, part of said pixels being active pixels representing image portions to be displayed on a display device;

wherein, when said plurality of lines are divided into a plurality of line groups each including at least two consecutive lines, the lines included in each group have the same number of pixels each and the number of pixels per line is made different between any adjacent two of said plurality of line groups; and wherein said plurality of line groups include a plurality of line groups excluding lines having said active pixels.

2. The semiconductor integrated circuit according to claim 1, wherein, of said plurality of lines, those having said active pixels having the same number of pixels.

3. The semiconductor integrated circuit according to claim 1, wherein, for every combination of adjacent two of said plurality of line groups, the number of pixels is made different by 1 between the two line groups.

4. The semiconductor integrated circuit according to claim 1, further outputting a second video signal which corresponds to a screen made of a plurality of lines having the same number of pixels each;

wherein said first and said second video signal are output with different frame frequencies; and wherein a value obtained by multiplying the frame frequency of said first video signal by the total number of pixels in said first video signal is made equal to a value acquired by multiplying the frame frequency of said second video signal by the total number of pixels in said second video signal.

5. The semiconductor integrated circuit according to claim 1, wherein, prior to the first line of the lines having said active pixels, either one or a plurality of lines each having the same number of pixels as the first line may be output.

6. A semiconductor integrated circuit for outputting a video signal which corresponds to a screen and which has a plurality of pixels on each of a plurality of lines constituting said screen, part of said pixels being active pixels representing image portions to be displayed on a display device, said semiconductor integrated circuit comprising a plurality of first registers;

wherein, when said plurality of lines are divided into a plurality of line groups each including at least two lines, the lines included in each group have the same number of pixels each and the number of pixels per line is made different between any adjacent two of said plurality of line groups; and wherein the number of lines included in each of said plurality of line groups is determined based on values placed in said plurality of first registers.

7. The semiconductor integrated circuit according to claim 6, further comprising a plurality of second registers which hold values for determining the number of pixels per line in each of said plurality of line groups.

8. The semiconductor integrated circuit according to claim 7, further comprising a third and a fourth register, said third register holding the number of pixels to be included, on each of the lines having active pixels, between the first pixel position and a pixel position preceding a pixel position into which to insert the first one of said active pixels, said fourth register holding the number of said active pixels on said lines that will have said active pixels;

wherein said plurality of second registers each hold the number of pixels included, on each of said lines having said active pixels, between a pixel position into which the last one of said active pixels is inserted and the last pixel position on each of the lines constituting each of said plurality of line groups; and wherein the number of pixels per line in each of said plurality of line groups is determined in accordance with the numbers placed into said plurality of second registers as well as with the numbers placed into said third and said fourth register.

9. The semiconductor integrated circuit according to claim 6, wherein said plurality of first registers are set default values, respectively, every time power is applied or whenever a reset signal is entered.

10. The semiconductor integrated circuit according to claim 7, wherein said plurality of first registers and said plurality of second registers are set default values, respectively, every time power is applied or whenever a reset signal is entered.

11. The semiconductor integrated circuit according to claim 8, wherein said plurality of first registers, said plurality of second registers, said third register, and said fourth register are set default values, respectively, every time power is applied or whenever a reset signal is entered.

12. The semiconductor integrated circuit according to claim 6, further comprising:

a register which holds a value for determining a pixel position into which to insert the first one of said active pixels on any of the lines that will have said active pixels.

13. The semiconductor integrated circuit according to claim 6, further comprising:

a register which holds a value for determining the number of said active pixels to be positioned on the lines that will have said active pixels.

14. The semiconductor integrated circuit according to claim 6, further comprising:

a register which holds a value for determining at least one pixel number of a pixel into which to insert predetermined data on at least one of said plurality of lines;

wherein, on the lines having said active pixels, said active pixels are inserted into a plurality of pixel numbers other than the pixel number determined by use of said register.

15. The semiconductor integrated circuit according to claim 11, further comprising two registers which hold values for determining a plurality of pixel numbers into which said active pixels are inserted.

16. A semiconductor integrated circuit for outputting in synchronism with a clock signal a video signal which corresponds to a screen and which has a plurality of pixels on each of a plurality of lines constituting said screen, said semiconductor integrated circuit comprising:

a pixel counter for counting up said clock signal in order to output a pixel number on each line;

a comparator for comparing a count value of said pixel counter with a comparative value;

a line counter for counting up a match signal output by said comparator in order to output a line number; and a controller for supplying said comparative value to said comparator;

wherein said controller further includes:

a plurality of decision circuits for which mutually exclusive ranges are established and which judge whether a count value of said line counter falls within any one of the established ranges; and a first selector which receives a plurality of mutually exclusive values and selects one of the values in accordance with the judgments by said plurality of decision circuits, the selected value being output as said comparative value to said comparator.

17. The semiconductor integrated circuit according to claim 16, wherein each of said plurality of decision circuits comprises a first register which holds a value for determining a range within which the corresponding decision circuit makes the judgment.

18. The semiconductor integrated circuit according to claim 17, wherein said controller comprises a plurality of second registers corresponding to said plurality of decision circuits; and wherein said first selector selects and outputs one of the values placed into said plurality of second registers.

19. The semiconductor integrated circuit according to claim 16, further comprising a second selector for selecting either the output of said first selector or a predetermined value upon receipt thereof, the selected value being output as said comparative value to said comparator;

wherein said second selector selects the output of said first selector if the output video signal should be a first video signal, said second selector further selecting said predetermined value if the output video signal should be a second video signal having a frame frequency different from the frame frequency of said first video signal.

20. The semiconductor integrated circuit according to claim 16, wherein said controller comprises:

a second decision circuit which, on receiving the count value from said pixel counter, judges whether the received count value falls within an established range; and a third selector which receives active pixels representing those portions of said video signal which are to be displayed on a display device and, based on the judgment by said second decision circuit, selectively outputs said active pixels;

wherein said second decision circuit includes a third register that holds a value specifying a range in which to make the judgment.

* * * * *